(12) United States Patent
Hedlund et al.

(10) Patent No.: US 10,682,626 B2
(45) Date of Patent: Jun. 16, 2020

(54) METHOD FOR PRODUCING A CRYSTALLINE FILM OF ZEOLITE AND/OR ZEOLITE LIKE CRYSTALS ON A POROUS SUBSTRATE

(71) Applicants: Jonas Hedlund, Luleå (SE); Allan Holmgren, Luleå (SE); Linda Sandström, Luleå (SE)

(72) Inventors: Jonas Hedlund, Luleå (SE); Allan Holmgren, Luleå (SE); Linda Sandström, Luleå (SE)

(73) Assignee: ZeoMem Sweden AB, Luleå (SE)

( * ) Notice: Subject to any disclaimer, the term of this patent is extended or adjusted under 35 U.S.C. 154(b) by 0 days.

(21) Appl. No.: 14/774,437

(22) PCT Filed: Mar. 14, 2014

(86) PCT No.: PCT/EP2014/055127
§ 371 (c)(1),
(2) Date: Sep. 10, 2015

(87) PCT Pub. No.: WO2014/140291
PCT Pub. Date: Sep. 18, 2014

(65) Prior Publication Data
US 2016/0023187 A1    Jan. 28, 2016

(30) Foreign Application Priority Data
Mar. 14, 2013 (SE) ..................... 1350312

(51) Int. Cl.
*B01J 20/32* (2006.01)
*B01J 29/06* (2006.01)
(Continued)

(52) U.S. Cl.
CPC ........ *B01J 20/3246* (2013.01); *B01D 53/228* (2013.01); *B01D 67/0051* (2013.01);
(Continued)

(58) Field of Classification Search
CPC ...... B01J 20/165; B01J 20/3246; B01J 29/06; B01J 2229/60; B01D 67/0051; B01D 71/028
See application file for complete search history.

(56) References Cited

U.S. PATENT DOCUMENTS 6,177,373 B1 * 1/2001 Sterte ................ B01D 67/0051
502/4
6,183,926 B1 * 2/2001 Kuroda ................ G03G 9/0819
399/223
(Continued)

FOREIGN PATENT DOCUMENTS

WO  WO-1993/001825 A1   4/1993
WO  WO-1994/005597 A1   3/1994
(Continued)

OTHER PUBLICATIONS

Cho et al "Ultra-Thin Zeolite Films Through Simple Self-Assembled Processes" Adv. Mater. 11(1999) p. 497-499.*
(Continued)

*Primary Examiner* — Nathan H Empie
(74) *Attorney, Agent, or Firm* — Ballard Spahr LLP

(57) ABSTRACT

The invention concerns a method for producing a crystalline film comprising zeolite and/or zeolite-like crystals on a porous substrate The method includes the steps of: a) providing a porous substrate, b) rendering at least a part of said porous substrate hydrophobic by treatment with a composition comprising one or more hydrophobic agent(s), d) subjecting said treated porous substrate to a composition comprising zeolite and/or zeolite-like crystals thereby depositing and attaching zeolite and/or zeolite-like crystals on said treated porous substrate, and e) growing a crystalline film comprising zeolite and/or zeolite-like crystals on said treated porous substrate obtained in step d). Crystalline films (Continued)

find use in a variety of fields such as in the production of membranes, catalysts etc.

11 Claims, 11 Drawing Sheets

(51) Int. Cl.
*B01D 67/00* (2006.01)
*B01J 37/02* (2006.01)
*B01D 53/22* (2006.01)
*B01D 69/10* (2006.01)
*B01J 21/04* (2006.01)
*B01J 29/08* (2006.01)
*B01J 29/035* (2006.01)
*B01D 71/02* (2006.01)
*B01J 20/16* (2006.01)
*B01J 35/06* (2006.01)

(52) U.S. Cl.
CPC ......... *B01D 69/105* (2013.01); *B01D 71/028* (2013.01); *B01J 20/165* (2013.01); *B01J 21/04* (2013.01); *B01J 29/035* (2013.01); *B01J 29/06* (2013.01); *B01J 29/08* (2013.01); *B01J 29/084* (2013.01); *B01J 37/0207* (2013.01); *B01D 2323/04* (2013.01); *B01D 2323/24* (2013.01); *B01D 2323/40* (2013.01); *B01D 2323/46* (2013.01); *B01D 2323/50* (2013.01); *B01J 35/065* (2013.01); *B01J 37/0209* (2013.01); *B01J 2229/32* (2013.01); *B01J 2229/60* (2013.01); *B01J 2229/64* (2013.01)

(56) References Cited

U.S. PATENT DOCUMENTS

| | | | | |
|---|---|---|---|---|
| 2002/0142242 A1* | 10/2002 | Inoue | ............ | G03G 9/0827 430/110.3 |
| 2005/0014371 A1* | 1/2005 | Tsapatsis | ............ | B01D 67/0051 438/689 |
| 2009/0239381 A1* | 9/2009 | Nishimi | ............ | B01D 69/02 438/694 |
| 2010/0016619 A1* | 1/2010 | Cheng | ............ | C01B 39/026 556/173 |

FOREIGN PATENT DOCUMENTS

| WO | WO-1997/003019 A1 | 1/1997 |
|---|---|---|
| WO | WO-1997/003020 A1 | 1/1997 |
| WO | WO-1997/003021 A1 | 1/1997 |
| WO | WO-1997/033684 A1 | 9/1997 |
| WO | WO-2000/053298 A1 | 9/2000 |
| WO | WO-2004/080889 A2 | 9/2004 |
| WO | WO-2014/140291 A1 | 9/2014 |

OTHER PUBLICATIONS

Hieda et al "Ultrasensitive quartz crystal microbalance with porous gold electrodes" Appl. Phys. Lett., vol. 84, No. 4, Jan. 26, 2004 628-630. (Year: 2004).*
Boudreau, L.C. and M. Tsapatsis, A Highly Oriented Thin Film of Zeolite A, Chemistry of Materials, 9(8):1705-1709 (1997).
Choi, S.Y. et al., Monolayer Assembly of Zeolite Crystals on Glass with Fullerene as a Covalent Linker, J. Am. Chem. Soc., 122:5201-5209 (2000).
Hedlund, J. et al., Controlling the Preferred Orientation in Silicalite-1 Films Synthesized by Seeding, Microporous and Mesoporous Materials, 28:185-194 (1999).
Kimura, T. et al., Esterification of the Silanol Groups in the Mesoporous Silica Derived from Kanemite, J Porous Mater, 5(2):127-32 (1998).
Kuzniatsova, T.A. et al., Synthesis of Thin, Oriented Zeolite A Membranes on a Macroporous Support, Adv Funct Mater, 18:952-958 (2008).
Naskar, M.K. et al., Influence of PVP Buffer Layer on the Formation of NaA Zeolite Membrane, J Porous Mater, 18:319-327 (2011).
Nishino, T. et al., The Lowest Surface Free Energy Based on—CF3 Alignment, Langmuir 15(13):4321-3 (1999).
Sandström, L. et al., Very High Flux MFI membrane for CO2 Separation, J Membr Sci, 380:232-40 (2011).
Sherman, J.D., Synthetic Zeolites and Other Microporous Oxide Molecular Sieves, Proc Natl Acad Sci USA, 97(11):6236 (2000).
Wenzel, R.N., Resistance of Solid Surfaces to Wetting by Water, Ind. Eng. Chem., 28(8):988-94 (1936).
Yan, Y. et al., Use of Diffusion Barriers in the Preparation of Supported Zeolite ZSM-5 Membranes, J. Membrane Sci., 126:53-65 (1997).
Yuan, W. et al., Synthesis and Characterization of High Performance NaA Zeolite-Polyimide Composite Membranes on a Ceramic Hollow Fiber by Dip-Coating Deposition, Desalination, 273:343-351 (2011).
International Preliminary Report on Patentability dated Jul. 10, 2015 by the International Searching Authority for International Patent Application No. PCT/EP2014/055127, which was filed on Mar. 14, 2014 and published as WO 2014/140291 on Sep. 18, 2014 (Inventor—Hedlund et al.; Applicant—Hedlund et al.) (18 pages).
International Search Report dated Aug. 27, 2014 by the International Searching Authority for International Patent Application No. PCT/EP2014/055127, which was filed on Mar. 14, 2014 and published as WO 2014/140291 on Sep. 18, 2014 (Inventor—Hedlund et al.; Applicant—Hedlund et al.) (7 pages).

* cited by examiner

METHOD FOR PRODUCING A CRYSTALLINE FILM OF ZEOLITE AND/OR ZEOLITE LIKE CRYSTALS ON A POROUS SUBSTRATE

CROSS-REFERENCE TO RELATED APPLICATIONS

This application is a U.S. National Phase Application of International Application No. PCT/EP2014/055127, filed on Mar. 14, 2014, which claims priority to Swedish Patent Application No. 1350312-3, filed Mar. 14, 2013, each of which are hereby incorporated by reference in their entirety.

TECHNICAL FIELD

The present invention relates to the field of films of zeolites and zeolite-like crystals, more specifically to the pretreatment of porous substrates onto which films can be grown and the deposition of seed crystals on the substrates, which is an essential step for the preparation of thin films. These materials find use in the fields of membrane separation, sensor technology, catalysis, ion exchange, and electrochemistry.

BACKGROUND OF THE INVENTION

Zeolites and zeolite-like materials are microporous materials with well-defined pores up to 13 Å in diameter. Many molecules, whether in the gas or liquid phase, both inorganic and organic, have dimensions that fall within this range. Selecting a molecular sieve with a suitable pore size therefore allows separation of a molecule from a mixture based on the size of the molecule, which explains why zeolites and zeolite-like materials also are denoted "molecular sieves". In addition to this separation mechanism, where only molecules smaller than the pores of the molecular sieve can permeate, the pores within the material can separate molecular components having different adsorption and/or diffusion properties. Apart from the selective separation of uncharged species, the well-defined pore system of the molecular sieve enables selective ion exchange of charged species and selective catalysis. In the latter two cases, significant properties in addition to the micropore diameter are important, for instance, ion exchange capacity, specific surface area and acidity. Molecular sieves can be classified in various categories, for example according to their chemical composition and their structural properties. A group of molecular sieves of particular interest is the group comprising zeolites and zeolite-like materials.

Zeolites and zeolite-like materials do not comprise an easily definable family of crystalline solids. However, the Structure Commission of the International Zeolite Association has presently approved more than 200 different zeolite framework types and assigned a 3-letter code to each framework. A criterion for distinguishing zeolites and zeolite-like materials from denser tectosilicates is based on the framework density, the number of tetrahedrally coordinated framework atoms per 1000 Å$^3$. The tetrahedrally coordinated framework atoms are also denoted T-atoms. The maximum framework density for zeolites and zeolite-like materials ranges from 19 to over 21 tetrahedrally coordinated framework atoms per 1000 Å$^3$, depending on the type of smallest ring present, whereas the minimum for denser structures ranges from 20 to 22. The Structure Commission maintains a zeolite structure database accessible via the internet [http://www.iza-structure.org/] and is also regularly revising and publishing the Atlas of Zeolite Framework Types. The 6th revised edition of the Atlas was published in 2007 [Ch. Baerlocher, L. B. Mc Cusker, D. H. Olson. Atlas of Zeolite Framework Types, 6th Ed., 2007, Elsevier, ISBN 978-0-444-53064-6]. Zeolite frameworks are built from $TO_4$ tetrahedra and the T-atoms are usually silicon and aluminium atoms, but zeolite frameworks can also be prepared from only $SiO_4$ tetrahedra. In the aluminophosphates ($AlPO_4$), the T atoms are aluminium and phosphorous atoms. However, there are many more possibilities and atoms such as Si, Al, P, Ga, Ge, B, Be, Ti, Fe etc. can serve as T-atoms in zeolite frameworks.

Zeolites and zeolite-like materials are microporous solids with a very regular pore structure of molecular dimensions. The dimensions of the channels control the maximum size of the molecular or ionic species that can enter the pores of a zeolite. The aperture of the channels are conventionally defined by the ring size, where, for example, the term "8-ring" refers to a closed loop that is built from 8 T-atoms and 8 oxygen atoms.

Zeolites and zeolite like materials have a porous structure that can accommodate a wide variety of cations, such as $Na^+$, $K^+$, $Ca^{2+}$, $Mg^{2+}$ and others. These positive ions can readily be exchanged, which explains why zeolites can serve as ion exchangers.

Natural zeolite minerals are usually formed where volcanic rocks and ash layers react with alkaline groundwater. Naturally occurring zeolites are rarely pure and are contaminated to varying degrees by other minerals, metals, quartz, or other zeolites. For this reason, naturally occurring zeolites are excluded from many important commercial applications where uniformity and purity are essential. Some of the more common zeolites found as minerals in nature are (3-letter codes within brackets) analcime (ANA), chabazite (CHA), clinoptilolite (HEU), heulandite (HEU), natrolite (NAT), phillipsite (PHI), and stilbite (STI).

Zeolites and zeolite like materials can also be prepared synthetically. A frequently prepared zeolite framework is the MFI framework, which has 10 T-atoms in the ring and thereby a suitable pore size for many applications. This framework can be prepared in pure silica form, i.e. the T-atoms are only silicon atoms. In this case, the structure is denoted silicalite-1. However, if some of the silicon atoms are replaced with aluminium atoms, the structure is denoted ZSM-5. Templates or structure directing agents are added to the reaction mixture in the synthesis of zeolites and zeolite like materials to direct the crystallization to the desired framework. For example tetrapropyl ammonium hydroxide is often used as a template in the synthesis of MFI zeolite.

There are numerous methods described in the art for the manufacture of substrate materials for inorganic catalysts and thin membranes, although there is still a need for improved substrate preparation, which is further explained herein. Substrates coated with thin films find their applications in for example the fields of membrane separation, sensor technology, catalysis, electrochemistry, ion exchange.

When the film is prepared on a porous substrate using hydrothermal synthesis techniques, a number of problems may arise. Firstly, species from synthesis solution used for growth of zeolites and zeolite-like materials may invade and be deposited within the porous substrate, resulting in reduction of the porosity of the substrate implying reduced permeation of gas or liquid molecules through the complete structure. Secondly, the substrate material may not be inert under the synthesis conditions used resulting in dissolution of atoms from the substrate to an unacceptable degree, atoms that may interfere with the intended structure of the zeolite. Thirdly, in cases where calcination is preferred to remove a structure-directing agent from the synthesized film, the invaded and deposited species in the substrate may lead to crack formation in the film and the substrate due to differences in thermal expansion properties between the species and the substrate.

Attempts to solve the first two problems have been described in the literature. WO94/25151 describes the use of a barrier layer which prevents water in the aqueous coating suspension used from entering the pores of the support to an extent such that the silica and zeolite particles form a thick gel layer on the support. The barrier layer may be temporary or permanent; temporary barrier layers were fluids such as water or glycol. By this method it was possible to synthesize thick films on the support.

Gavalas et al. describe the use of a specific barrier in zeolite membrane synthesis; "Use of diffusion barriers in the preparation of supported zeolite ZSM-5 membranes", Journal of Membrane Science, 126 (1997), 53-65. The authors describe a method implying that a mixture of furfuryl alcohol and tetraethylorthosilicate was impregnating a support. After impregnation, the mixture was polymerized by exposure to p-toluene sulfonic acid at elevated temperature and the resulting polymer was subsequently carbonized. Before the synthesis of the zeolite membrane, the carbonized polymer was removed from the top region of the support where the zeolite membrane was to be deposited. After synthesis of the zeolite membrane, all the carbon was removed by calcination. However, TEOS became converted to a silicate and deposited within the pores of the support not covered by carbon.

Thin continuous films of zeolite or zeolite-like crystals may be produced with techniques well known in the art. However, the preparation of the substrate upon which a continuous zeolite or zeolite-like film will be synthesized may vary. It is not always necessary to mask a porous substrate upon which a film of zeolite or zeolite-like crystals is grown. However, if masking of the substrate is preferred in order to prohibit the invasion of species from the synthesis solution into the substrate used as a support for the film, the masking procedure may involve filling the pores in the substrate with polymers or wax. Such a procedure is described in WO 00/53298. This rather time consuming and practically complicated procedure implies that the top layer of the substrate, where the zeolite film is to be synthesized, is first covered with a thin layer of a polymer that is soluble in polar aprotic solvents, such as acetone. The polymer may be polymethylmetacrylate (PMMA) and the solvent might be acetone, as described in WO 00/53298. Subsequently, the porous substrate may be filled with paraffin wax, which is not soluble in solvents such as acetone. To be able to deposit seed crystals necessary for film growth onto the substrate surface, the first layer (PMMA) was removed since the method described in WO 00/53298 relied on the attachment of a cationic polymer onto the bare substrate surface. The cationic polymer facilitates the deposition of seed crystals onto the substrate surface, because of the well-known electrostatic (Coulomb) attraction between oppositely charged sites. From these seed crystals, a membrane film could grow when the substrate with seed crystals was immersed into a suitable synthesis solution under hydrothermal conditions. However, a drawback with this masking procedure is not only the time required to mask a substrate, but also the depth precision and masking efficiency and in addition, the method is difficult to apply on supports with complex geometries, such as multi-channel tubes needed applications. Ideally the PMMA layer, brought onto the top layer of the substrate from acetone solution, should coat the top layer of the porous substrate surface without invading (entering) the small pores of the top layer (e.g. 100 nm pores) of the support and the wax should ideally impregnate the porous substrate completely up to the PMMA layer. Experience shows that this ideal masking sometimes is very hard to accomplish in practice. PMMA dissolved in acetone tends to invade (penetrate into) the top layer of for example a porous α-alumina substrate. In practice, the penetration of PMMA into the top layer may vary from essentially zero to several micrometers into the support. This results in incomplete filling of the support with wax and subsequent invasion of species from the synthesis solution and/or film growth into the substrate pores during film growth. A problem here is that a thicker zeolite membrane will imply a lower flux and permeance through the membrane than was desirable. A lower permeance implies that for example less of $CO_2$ can be extracted from a feed of synthesis gas within a given time period, which affect the cost efficiency of the membrane process.

Another problem with the masking concept described above is the lack of control of the thickness of the synthesized membrane, since the invasion of species from synthesis solution may vary between different synthesized films/membranes as well as between different parts of the same film/membrane.

A further problem associated with the masking concept described above and the partial invasion of the synthesis solution in the support is the fact that the conditions required for synthesizing numerous zeolite framework films are so severe that the substrate is partly dissolved or etched. Accordingly, aluminium may be dissolved from the top layer of a non-masked or incompletely masked α-alumina substrate leading to a zeolite structure that was not intended to be produced.

A further problem with the masking concept described above is that it is difficult to apply to supports with complex geometries, such as multichannel tubes, needed to create large membrane surfaces for practical application of the membranes. Examples of commercially available multi-channel alumina tubes are those sold by Inopor GmbH. Such tubes may for instance comprise 19 channels with a diameter of only 3.5 mm and a length of 1.2 m. It is straightforward to realize that it will be difficult to coat these narrow and long channels with PMMA perfectly as required for membrane preparation. Incomplete coating with PMMA would lead to protrusion of wax inside the channels, which would result in incomplete coverage of the channels with film and thereby defective membranes.

WO97/33684 discloses a procedure for preparing molecular sieve films, wherein microcrystals are attached on a substrate having a surface charge opposite to the charge of the microcrystals. Substrates with surface charge are hydrophilic. Subsequently, a molecular sieve film is allowed to grow on the substrate.

Accordingly, there is still a need in the art to produce films and membranes which avoid or minimizes the problems mentioned above, which are associated with known procedures for preparing films comprising zeolite and/or zeolite-like crystals on porous substrates. There is also a general need in the art to provide alternative measures for pretreatment of substrates or supports onto which subsequently seed crystals are to be deposited.

SUMMARY OF THE INVENTION

The problems in the art have now been overcome or at least mitigated by the present invention by presenting a new method allowing to prepare thin films on porous or non-porous substrates which e.g. avoids invasion of a porous support, i.e. the deposition of material in the pores of the support, and which provides for an alternative and/or improved method of pretreating a support before deposition of seed crystals thereon. By making the porous support hydrophobic, the leaching of atoms from the support is minimized also at severe synthesis conditions where the substrate may otherwise be partly dissolved or etched and invasion is minimized.

Accordingly, there is provided a method for producing a crystalline film comprising zeolite and/or zeolite-like crystals on a porous substrate, said method comprising the steps of:
a) providing a porous substrate,
b) rendering at least a part of said porous substrate hydrophobic by treatment with a composition comprising one or more hydrophobic agent(s),
d) subjecting said treated porous substrate to a composition comprising zeolite and/or zeolite-like crystals thereby depositing and attaching zeolite and/or zeolite-like crystals on said treated porous substrate, and
e) growing a crystalline film comprising zeolite and/or zeolite-like crystals on said treated porous substrate obtained in step d).

There is also provided herein a crystalline film, comprising zeolite and/or zeolite-like crystals, which is obtainable by a method as provided herein as well as the use of a crystalline film produced by a method as provided herein, as a membrane, catalyst, sensor, adsorbent, and/or an electrode.

There is also provided herein an article, comprising a crystalline film and a substrate modified according to a method herein.

Definitions

A "zeolite and/or zeolite-like crystal" as prepared and referred to herein, may be a crystal of any of the framework types approved by the Structure Commission of the International Zeolite Association (http://www.iza-structure.org/). Such zeolites have the characteristics of large internal pore volume, molecular-size pores, regularity of crystal structure, and a diverse framework chemical composition making them highly active and selective catalysts, adsorbents, ion exchangers, and molecular sieves [J. D. Sherman. Proc Natl Acad Sci USA. 2000 May 23; 97(11); 6236.] The term crystal as referred to herein also refers to all synthetic crystals of zeolites and zeolite-like materials of any the framework types approved by the Structure Commission of the International Zeolite Association (http://www.iza-structure.org/). Representative of zeolite and/or zeolite-like crystals which may be produced by a method as disclosed herein include but are not limited to those of structure types AFI, AEL, BEA, CHA, EUO, FAU, FER, KFI, LTA, LTL, MAZ, MOR, MEL, MTN, MTT, MTW, OFF, TON, and especially MFI zeolites. Further examples falling within the above frameworks include silicalite, silicalite-1, TS-1, ZSM-5, and the zeolites sodalite, A, Beta, L, Y, X, ZSM-22, ZSM-11, ZSM-2, and SAPO-34. Some of the above materials, while not being true zeolites are frequently referred to in the literature as such, and the term zeolite will herein be used broadly to include such materials. Further, whenever a crystal, the crystals or the like is referred to herein, this is of course intended to refer also to a plurality of crystals of a framework type as defined herein. The crystals may also herein be referred to as microcrystals.

A "substrate" as provided herein, is a porous substrate. A "porous substrate" is a substrate used as a support for producing crystalline films as presented herein, wherein said substrate comprises a certain porosity. The substrate usually comprises two distinct layers. The fine-grained thin top layer of a porous substrate usually exhibits pore sizes between about 1 to 1000 nm and supports the zeolite film, whereas the coarse-grained thick bottom or base layer has larger pores often in the micrometer range, such as 1 μm to 10 μm, such as 3 μm. The pore sizes of a substrate advantageously cause a low pressure drop while still providing mechanical stability to the membrane. Surface modification(s) of a substrate presented herein may be performed to any suitable porous substrate s.

A "crystalline film" referred to herein, is a crystalline structure characterized by exhibiting an X-ray diffraction pattern characteristic of the synthesized framework structure.

A "hydrophobic surface" referred to herein, is a substrate surface exhibiting a static contact angle of 90° or more at the three-phase contact line where a water droplet, substrate, and vapor phase meet.

The term "monolayer" in the present context refers to a one crystal thick layer comprising discrete crystals, which are deposited on a substrate. The crystals and other materials if present may be closely packed to provide a classical monolayer. Alternatively the crystals and other materials if present are not closely packed and therefore are present as a sub-monolayer. The exact packing density required depends to a certain degree on the nature of the crystals and the desired film to be grown from these crystals. The packing density of crystals in the monolayer should in any event be such as to enable a thin layer of a zeolite film to be grown and intergrown from the crystals. However, the method as disclosed herein is not limited to deposition of only a monolayer, since films also can be grown from multilayers.

An "amphiphile" refers to a chemical compound which possesses both hydrophilic (polar) and lipophilic (unpolar) properties. Such a compound may also be referred to as an amphiphilic or amphipathic compound. A lipophilic group is typically a large hydrocarbon moiety, whereas a hydrophilic group falls into one of two groups; charged groups (anionic or cationic) or polar uncharged groups. Examples of amphiphiles suitable for use are further presented herein.

The term "invasion" refers to unwanted deposition of material in the pores of the support. The material may be amorphous or crystalline material originating from the synthesis solution or originating from other sources. The seed crystals may grow into the pores of the support, which results in invasion of the support by crystalline material. Ideally, the film should only coat the outermost part of the support and the pores of the support should be fully open, i.e. the invasion of the support should be minimal.

A "masking procedure" as referred to herein, refers to a procedure wherein a substrate is treated to avoid invasion of crystals growing down in the pores of said substrate or invasion of any species from the synthesis solution.

Herein, the terms "dispersion", "solution" and "mixture" may be used interchangeably and refers to one or more compound(s), which are present in an aqueous or non-aqueous solution/mixture/dispersion.

The terms "membrane" and "film" as referred to herein, may be used interchangeably and refer to a barrier having separation properties, for separation of fluid mixtures such as mixtures of gases, liquids or mixtures thereof.

In this document, the terms "structure", "article" and "object" are used interchangeably.

In this document, nm stands for nanometer and mm stands for millimeter.

It should be noted that all examples mentioned herein of materials, concentrations and any ranges or the like are applicable to all aspects of the invention even if not specifically mentioned.

DESCRIPTION

Figure 1:
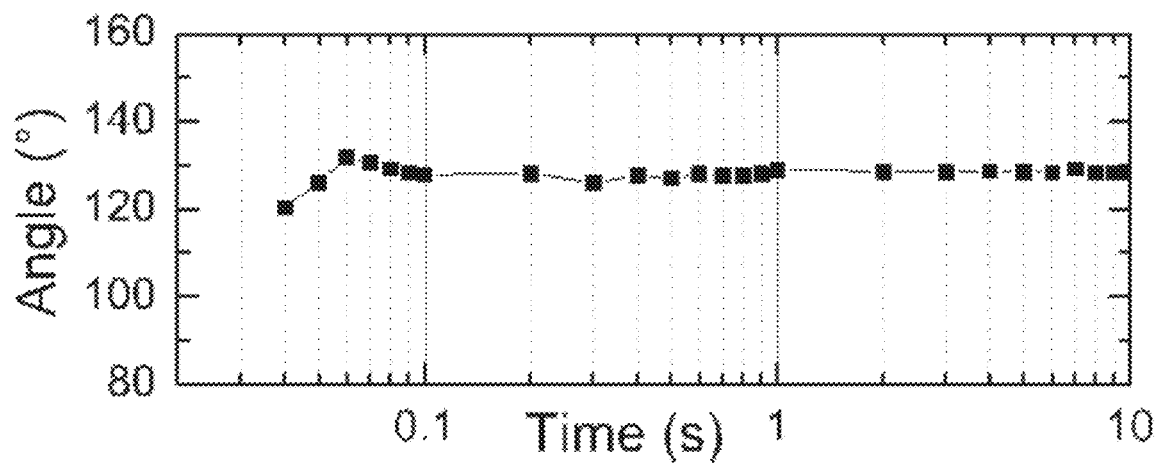
FIG. 1. The time dependence of the contact angle between water and the porous α-alumina substrate according to Example 1.

There is provided herein a method for producing thin films comprising zeolites and/or zeolite-like crystals on a porous substrate wherein said film when synthesized on a porous substrate may be synthesized with minimal invasion and leaching of a porous substrate by rendering said substrate hydrophobic. There is also provided a method which is an improved and/or an alternative method for pretreating substrates before the deposition and/or attachment of seed crystals thereon. The substrates, which may also serve as a support for the film, may be substances with any porosity or are porous substrates with a well-defined and regular porosity as well as substrates with natural or synthetic porosity. Films as produced herein find use in the fields of membrane separation, sensor technology, catalysis, electrochemistry, ion exchange.

Accordingly, there is provided a method for producing a crystalline film comprising zeolite and/or zeolite-like crystals on a porous substrate The method comprises the steps of:
  a) providing a porous substrate,
  b) rendering at least a part of said porous substrate hydrophobic by treatment with a composition comprising one or more hydrophobic agent(s),
  d) subjecting said treated porous substrate to a composition comprising zeolite and/or zeolite-like crystals thereby depositing and attaching zeolite and/or zeolite-like crystals on said treated porous substrate, and
  e) growing a crystalline film comprising zeolite and/or zeolite-like crystals on said treated porous substrate obtained in step d).

The one or more amphiphiles may be added to the composition in step d).

Further, the method may comprise a step c) subsequent to step b) and prior to step d): c) treating the hydrophobic porous substrate obtained in step b) with a composition comprising one or more hydrophobicity adjusting agent(s), such as one or more amphiphile(s) and/or one or more ionic polymers.

The amphiphiles and/or one or more ionic polymers may be as described herein. The one or more ionic polymer may be a cationic polymer.

It is particularly useful to produce thin films with a controlled thickness and minimum invasion on porous substrates using a method as disclosed herein. A thin film produced by a method provided herein, refers to a film with a thickness of about less than 10 µm, such as less than about 1 µm, such as about 0.5 µm.

The method as disclosed herein may also comprise a masking procedure, as said method may aim at masking a porous substrate before zeolite and/or zeolite-like crystals are seeded and grown thereon to avoid invasion of the support by growth of zeolite and/or zeolite-crystals down into the pores of a porous substrate or invasion by species from the synthesis solution. An improved masking procedure implies shorter masking time and virtually no invasion of a porous substrate meaning that virtually no species from synthesis solution invades into the pores of the substrate and form an amorphous and/or crystalline phase, thereby substantially avoiding aforementioned drawbacks in the prior art. Hence, there is provided herein a hydrophobic substrate, which may be made hydrophobic throughout virtually all the substrate pores and up to the outermost surface of the substrate while keeping the substrate porous. Furthermore the method provided herein is fast and may easily be applied to supports with complex geometries.

Accordingly, a substrate may be masked and/or pretreated by rendering a porous substrate hydrophobic by treating said substrate with one or more hydrophobic agent(s), of which examples are provided herein. Thereafter, a hydrophobic surface of said porous substrate is provided with zeolite and/or zeolite crystals (seed crystals), optionally after one or more further surface modification(s) of said hydrophobic surface, and thereafter said crystals are allowed to grow on said hydrophobic surface or on said further modified hydrophobic surface to form a film. The surface modifications are described in more detail herein, as well as the procedure for depositing the seed crystals onto said hydrophobic substrate. However, the procedure to grow a film from the seed crystals is well-known from prior art and is therefore only described briefly herein.

When using the method as provided herein, and when using a porous substrate, said porous substrate will remain porous even after the substrate has been treated with one or more hydrophobicity adjusting agent(s). This is different from other methods used in the art, such as when a support is masked with wax. Further, close to the entire substrate material is protected, and especially the most critical part of the support material i.e. the upper part or top layer or outer surface of the material containing small pores which previously have been difficult to completely protect using prior masking methods. Without wishing to be bound by theory, this may be due to the fact that that it is more difficult for viscous fluids to enter very small pores than much larger pores and this difficulty should increase with decreasing pore size. Furthermore, the deposition of seed crystals on the hydrophobic substrate is different from previous methods known in the art, since the deposition presented herein relies on interactions between a hydrophobic substrate and hydrophilic or partly hydrophobic seed crystals.

Preparation of hydrophobic surfaces may in principle be accomplished in two different ways; physically by optimizing the roughness of the substrate and chemically by deposition of hydrophobic molecules or entities onto the surface, or a combination of the two methods. It is well-known that fluorine in fluor-carbon compounds is efficient in lowering the surface free energy chemically because of its high electronegativity and accordingly strong covalent bonds with carbon atoms. (Takashi Nishino et al., Langmuir 1999, 15, 4321-4323).

It is well known that the surface tension of most liquids decreases with increasing temperature in a nearly linear fashion and becomes very small in the region of the critical temperature, when the intermolecular cohesive forces approach zero. The surface tension of water is 72.72 mN/m at 20° C., but drops to 58.91 mN/m at 100° C. [Handbook of Chemistry and Physics, $71^{st}$ Edition, 1990-1991, CRC Press, INC., ISBN: 0-8493-0471-7]. Consequently, the static contact angle between water and a substrate surface prepared according to a method as provided herein should be larger than 90°, preferably larger than 110° at 20° C., such as 125°. Such a high contact angle is facilitated by the roughness of the substrate surface. [R. N. Wenzel, Ind. Eng. Chem. 1936, 28, 988-994.]

The method as provided herein is also simpler and cheaper to use than prior methods as all steps of said method may be carried out in e.g. a plastic beaker, e.g. no vacuum oven etc. is needed. Further, said method is fast and provides an attractive alternative within commercial timeframes.

It further involves less work as its basis is only treating the substrate in different solutions. In addition, the masking through rendering a surface of said substrate hydrophobic may be performed in less than 1 h, as compared to masking using wax which usually require about 3 weeks. The method as provided herein is further well suited for substrate materials with a complex geometry, such as multi-channel tubes or honeycombs.

Particularly, the outer surface of the porous substrate used, where the zeolite and/or zeolite-like crystals are to adhere and grow into a film, is more hydrophobic by using a method as provided herein. To the hydrophobic surface which is then generated, one alternative is to directly attach hydrophobic zeolite and/or zeolite-like crystals by hydrophobic interactions, which can thereafter grow into thin films for further uses as presented herein. Said crystals may obtain a hydrophobic character by any of the methods provided herein, or any other suitable methods known in the art. However, it is possible to in different manners, as presented herein, attach said crystals to a substrate through the hydrophobic surface e.g. generated by a masking method/pre-treatment method presented herein.

As one alternative, it is possible to attach ionic amphiphiles, such as exemplified herein, directly to a hydrophobic surface of a substrate using hydrophobic interaction and thereafter attach zeolite and/or zeolite-like crystals having an opposite charge to the surface sites formed after the attachment of said one or more amphiphile(s) to the hydrophobic surface, still keeping the surface hydrophobic. This is for example suitable when said amphiphile comprises a cation, to which thereafter negatively charged zeolite and/or zeolite-like crystals may attach. By such a seeding alternative, the surface charge of the substrate is not reversed from an initially negative to a positive value, as described in prior art such as for example in WO 97/33684. A hydrophobic substrate provided by the method described herein is a prerequisite for seed crystals to remain attached to the substrate by hydrophobic interactions between the non-polar part of the amphiphiles and the hydrophobic substrate surface. The methods set forth in WO 97/33684 describe an initially negatively charged substrate surface and therefore a hydrophilic surface, which is charged reversed by treating the same surface with a cationic polymer.

It is also possible to e.g. attach ionic amphiphiles to a hydrophobic surface of said substrate using hydrophobic interaction, followed by a further modification by providing one or more ionic polymer(s) to said amphiphilic surface to change the character of the ionic sites after the attachment of amphiphiles thereto, and thereafter in a suitable manner attach zeolite and/or zeolite-like crystals to this modified surface. This is for example suitable when said amphiphile comprises an anion, and wherein said amphiphilic surface is then provided with a cationic polymer to provide positively charged surface sites to which a negatively charged crystal may thereafter attach.

Such modifications of the surface may be seen as a layer on layer principle, where the hydrophobic surface forms the bottom layer and wherein suitably additional surface modifications are provided for to attach the zeolite and/or zeolite-like crystals to a porous solid substrate. A surface modification method or pretreatment method as provided herein is particularly suitable for porous solid substrates.

Said zeolite and/or zeolite-like crystals may also be treated with one or more compositions comprising one or more amphiphile(s), e.g. by forming a dispersion comprising said crystals and one or more amphiphile(s), so that the crystals per se become at least partly hydrophobic by virtue of the treatment with said one or more amphiphiles, and wherein thereafter the formed at least partly hydrophobic crystals are directly attached onto a hydrophobic surface of a substrate as provided herein. Accordingly, said crystals are then attached to said substrate through hydrophobic interaction.

An amphiphile and/or an ionic polymer which is provided to a surface herein, may be present in a dispersion which is suitable for the compound in question.

In the first step of the method of growing a crystalline film, the crystals may be referred to as seed crystals which are provided, usually in dispersion, to said porous substrate, either directly to said hydrophobic surface or to a further modified surface thereof, to form a layer, such as a monolayer, or multilayer of crystals thereon. The layer or monolayer comprising seed crystals is in a second step brought in contact with a synthesis mixture containing all the raw materials or starting materials needed for growth of the seed crystals to a film of the desired framework structure. The seeding and growth of the crystals occurs on a hydrophobic surface or on a further modified surface of a porous substrate as presented herein. Hence, in a first step, a layer or monolayer or multilayer of zeolite and/or zeolite crystals is formed, which may be seen as an intermediate product in the formation of the film. The layer or monolayer or multilayer is then allowed to grow into a film by hydrothermal treatment. Accordingly, an intermediate product is then comprised within the film. Growing crystals by hydrothermal treatment is a procedure known in the art. However, methods to provide said substrate with seed crystals known in prior art differs from the method provided herein.

The zeolite and/or zeolite-like crystals used herein as seeds may refer to crystals with a length of less than 1000 nm, such as less than 500 nm, such as less than 200 nm, such as less than 100 nm, but is not limited thereto, the length of which can be identified by using Scanning Electron Microscopy. The crystals may be prepared by any suitable method known in the art, such as a method as disclosed in International Application PCT/SE93/00715 published as WO 94/05597. This document describes a method whereby it is possible to synthesize colloidal suspensions of discrete molecular sieve microcrystals suitable for use in the preparation of monolayer structures. Molecular sieves such as zeolites or crystalline microporous metal silicates are generally synthesized by hydrothermal treatment of a silicate solution with a well-defined composition. This composition, as well as the synthesis parameters such as temperature, time and pressure, determines the type of product and the crystal shape obtained.

Suitable seed crystals may be prepared in accordance with a method as presented in WO 93/08125, or other methods known to those skilled in the art. Representative of molecular sieves (zeolites) which may be used include but are not limited to those of structure types AFI, AEL, BEA, CHA, EUO, FAU, FER, KFI, LTA, LTL, MAZ, MOR, MEL, MTN, MTT, DDR, MTW, OFF, TON (includes zeolite X and zeolite Y) zeolite beta, sodalite, ferrierite, phillipsite and especially MFI zeolites. MFI zeolites with Si/Al ratios greater than 300 are herein referred to as silicalite. Some of the above materials, while not being true zeolites are frequently referred to in the literature as such, and the term zeolite will herein be used broadly to include such materials.

Further, a starting material for producing seeds of zeolite and/or zeolite-like crystals and for subsequent growth of the seeds to a film may be selected from any compounds which is/are sufficiently reactive to produce a framework structure as previously mentioned herein. Examples of suitable silicon sources for producing a zeolite and/or zeolite-like crystal are for example silicon alkoxides, hydrated silicates, precipitated silica powders, fumed silica, and colloidal silica sols. Suitable aluminum sources are aluminium alkoxides, such as aluminium isopropoxide, aluminium metal, and aluminates. Further examples of starting materials are monomeric forms of silicon such as tetraethyl orthosilicate and monomeric forms of aluminium such as aluminium isopropoxide. As an example, a synthesis mixture to form a zeolite and/or zeolite-like crystal is described in International Application WO93/08125. In that process, a synthesis mixture is prepared by boiling an aqueous solution of a silica source and an organic structure directing agent in a proportion sufficient to cause substantially complete dissolution of the silica source. The organic structure directing agent, if used, is advantageously introduced into the synthesis mixture in the form of a base, specifically in the form of a hydroxide, or in the form of a salt, e.g., a halide, especially a bromide. Mixtures of a base and a salt thereof may be used, if desired or required, to adjust the pH of the mixture. Other methods for producing crystals are e.g. described in PCT/EP96/03096, PCT/EP96/03097, and PCT/EP96/0309698.

Accordingly, the zeolite and/or zeolite-like crystals may be produced by the hydroxide route or the fluoride route, or a combination thereof. Such methods are known in the art.

Before the substrate is rendered hydrophobic, the substrate is purified from possible contamination by washing with a suitable solvent such as acetone or a calcination procedure is performed. During calcination the substrate, e.g. $\alpha$-$Al_2O_3$, is slowly heated from room temperature to about 500° C. At such a temperature, the substrate is allowed to calcinate for about 6 h, where after it is cooled to room temperature. Heating and cooling takes about 6 h, respectively. This procedure is performed so that any organic residues will be removed from the substrate and is a procedure which is used in the art.

As mentioned in the above, a surface of the substrate may be rendered hydrophobic in many different ways, such as by using silanes (e.g. methoxy-, ethoxy, chloro-) with a perfluorated alkyl chain to thereby obtain a very hydrophobic substrate. The hydrophobic agent may be dissolved in a non-aqueous solvent such as ethanol, propanol or any other alcohol, and the low viscosity of the solution makes it possible for the solution to enter into all or at least most of the pores of the substrate, which is thereby rendered hydrophobic.

Accordingly, a chemical modification of the surfaces of the substrate is performed by a method as provided herein, which is in sharp contrast to the previous methods known in the art relying on a simple pore filling by for instance wax.

The hydrophobic and/or hydrophobicity adjusting agent may comprise one of more of the following: hydroxamate(s) and/or one or more silane coupling agent(s) such as alkyl silanes, fluorinated alkyl silanes, perfluorinated alkyl silanes, alkoxy silanes, hydro silanes, chloro silanes, amino silanes, mercapto silanes, or a combination thereof.

The hydrophobic and/or hydrophobicity adjusting agent may be selected from octylhydroxamate, decylhydroxamate, dodecylhydroxamate, N-(6-aminohexyl)aminomethyltriethoxysilane, 3-mercaptohexyl-trimethoxysilane, octadecyltrihydrosilane, triethoxypropylsilane, 1H,1H,2H,2H-perfluorodecyltriethoxysilane, 1H,1H,2H,2H-perfluorodecyltrichlorosilane, trimethyloctylsilane, octyltrimethoxysilane, 1H,1H,2H,2H-perfluorocetylmethyldichlorosilane, 1H,1H,2H,2H-perfluorooctyltrimethoxysilane, or a combination thereof.

After, after the porous substrate has been rendered hydrophobic, or at least the part of the surface on which a crystalline film is to grow, the surface of the porous substrate may be further modified. By such a procedure, the hydrophobic surface is still maintained but a further composition comprising one or more amphiphiles and/or a composition comprising one or more ionic polymers, is provided to the hydrophobic surface of a substrate, forming a second modified surface, which modified surface is thereafter used for attaching zeolite and/or zeolite-like crystals to the substrate.

An amphiphile attaches to the hydrophobic surface of said substrate by hydrophobic interaction. This is in sharp contrast the method described in patent WO97/33684, where only electrostatic interactions are used and the surface is not hydrophobic. Accordingly, herein an amphiphile may be used in such a context wherein the hydrophobic part thereof will turn to a hydrophobic environment e.g. the hydrophobic substrate. Whether the amphiphile is anionic or cationic, the modified surface of the substrate will still be hydrophobic after this treatment. If the amphiphile is anionic, the surface may thereafter be treated with a cationic polymer to obtain surface sites with a positive charge to thereafter attach negatively charged zeolite and/or zeolite-like crystal seeds. Accordingly, if both a composition comprising one or more amphiphile(s) and a composition comprising one or more ionic polymers are used for the surface modification, these are deposited in separate subsequent steps meaning that said composition comprising one or more ionic polymer will attach to the newly formed surface comprising one or more amphiphile(s).

A cationic polymer may have a repeat unit such as a quaternary amine with hydroxyl groups in the main chain. An example of such a polymer is poly(dimethylamine-co-epichlorhydrin-co-ethylenediamine with a repeat unit $[CH_2CH(OH)CH_2N(CH_3)_2]_n^+$ and a molecular weight of 75,000 g/mol marketed by Sigma-Aldrich. Other suitable polymers are well known in the art.

A cationic amphiphile may also be used thereby producing positively charged surface sites, which are possible to seed with negatively charged zeolite crystals. Thereby, it is not needed to provide a composition comprising one or more ionic polymer(s) to said substrate.

A cationic amphiphile may also be used to modify the charge of the zeolite crystals thereby making them partly hydrophobic and possible to attach to a hydrophobic surface. Thereby, it is not needed to provide a composition comprising one or more ionic polymer(s) to said substrate.

An aminosilane may also be used and covalently attached to the hydrophobic substrate surface exposing the amine function in a direction from the surface thereby producing positively charged surface sites at pH values commonly used upon seeding a substrate, such as pH between 9 and 11, such as pH about 10. Thereby, it is not needed to provide a composition comprising one or more ionic polymer(s) to said substrate.

Further, zeolite and/or zeolite-like crystals may be rendered partly hydrophobic i.e. less hydrophilic and provided with an amphiphilic character. This is possible e.g. by esterification of one or more silanol groups on the zeolite and/or zeolite like crystals. The most common reagents to make silica and siliceous surfaces at least partly hydrophobic are based on silanes, such as alkylchloro or alkylethoxy silanes [Pluddeman, E. P. Silane Coupling Agents; Plenum Press: New York, 1991.]. In these reactions, a monochloro or monoethoxy silane is preferred because of less possibility of side-reactions leading to formation of oligomeric clusters. Another possibility is the esterification of silanol groups with alcohols such as 1-butanol or 1-octanol, whereupon water is released [Tatsuo Kimura et al., Journal of Porous Materials 5, 127-132 (1998).].

Thereafter, such zeolite and/or zeolite-like crystals may be attached onto a hydrophobic surface of a substrate as presented herein. Hence, by such a procedure, no additional surface modification is needed before attaching the zeolite and/or zeolite-like crystals onto said substrate.

Accordingly, methods provided herein are suitable to prepare substrates such as porous substrates for the deposition of a layer or a monolayer or multilayer of zeolite and/or zeolite-like crystals thereon from which a film or membrane will grow under hydrothermal crystallization conditions avoiding or at least minimizing invasion of the pores of a porous substrate. Invasion of dissolved species from synthesis solution or invasion by growth of zeolite crystals may result in a thicker film and hamper the gas or liquid permeation of the synthesized zeolite film/membrane and negatively affect its efficiency in applications, for example as adsorbent, membrane, or catalyst.

As shown herein, for obtaining a zeolite film on a hydrophobic substrate with deposited microcrystals, the substrate may be exposed to a synthesis solution under hydrothermal treatment in for instance a Teflon bottle placed in an autoclave until an about 500 nm thick film is formed, which may require about 28 hours at 95° C. for zeolite films based upon $OH^-$ as mineralizing agent. Because of said hydrophobicity of the porous substrate, the synthesis solution will not penetrate at all, or at least only to a limited extent penetrate into the pores of the porous substrate and accordingly little or no invasion of dissolved species from synthesis solution zeolite growth will occur.

There is provided herein a method to prepare a layer or monolayer or multilayer structure comprising zeolite and/or zeolite-like crystals densely packed on the substrate surface. A dense layer of microcrystals deposited on a substrate surface is important for the growth and inter-growth of a membrane film at the substrate surface. If the microcrystals were deposited as a sparsely sub-monolayer, the growth and inter-growth of the zeolite film would provide a thicker zeolite film. A thicker zeolite film would impair the permeation of gas and liquid molecules through the membrane.

The method as provided herein facilitates the synthesis of well-defined thin zeolite films on substrate surfaces with little or no invasion, which facilitates the control of the film thickness as well as the performance of the synthesized membrane in all possible applications, such as in selective separation processes, catalytic membrane reactors, chemical sensors, electrochemistry, and in the preparation of membranes from zeolite and zeolite-like crystals Thus, there is provided herein a method to prepare a substrate in such a way that hydrophobicity and/or masking of the substrate extends up to the outermost surface of the substrate, implying that e.g. the invasion of species from solution is minimized when using a porous substrate. Hence, the synthesized crystalline zeolite film may be grown and inter-grown from zeolite and/or zeolite-like seed crystals forming a layer or monolayer or multilayer structure on the substrate surface using a synthesis method comprising; a) deposition of a monolayer or multilayer of zeolite or zeolite-like crystals on a substrate which crystals serves as nuclei for growth a film of zeolite and/or zeolite-like crystals, b) forming a zeolite and/or zeolite-like synthesis solution, c) contacting a) and b) and grow a zeolite film under hydrothermal conditions.

A method for producing a crystalline film comprising zeolite and/or zeolite-like crystals on a substrate may also be referred to as a method for preparing a structure comprising a crystalline film comprising zeolite and/or zeolite-like crystals, wherein said structure produced by such a method comprises a substrate and zeolite and/or zeolite-like crystals.

In a method as provided herein, the substrate used is hydrophobic on any surface directly facing zeolite and/or zeolite-like crystals and/or any surface indirectly facing zeolite and/or zeolite-like crystals through a further surface modification of said hydrophobic surface of a porous or non-porous substrate. Still, all surface(s), or the entire surface, of a substrate as presented herein may not be hydrophobic, especially if a surface of a substrate is not used for seeding and growing crystals on. Hence, when it is referred to "at least a part of a surface is rendered hydrophobic" or "rendering at least a part of said porous substrate hydrophobic", this still means that the part of the surface of a substrate to which a further surface modification is to be performed, or to which zeolite and/or zeolite-like crystals is to directly attach, still fulfill the criteria for being hydrophobic and not allowing virtually any invasion of pores of a substrate, as previously defined herein. Hence, this may also be referred to as rendering the surface of a substrate, i.e. a porous or non-porous substrate hydrophobic, to which surface zeolite and/or zeolite-like crystals are to directly or indirectly adhere. Examples of rendering a surface hydrophobic are provided in the experimental section.

A substrate used in a method as provided herein may be selected from a group comprising or consisting of glass, sintered metals, metal alloys, steel, nickel, silicon, noble metals, carbon, polymers, inorganic oxides, alpha-alumina, gamma-alumina, titania, zirconia, silica, alumina/zirconia mixture(s), alumino silicates, cordierite, zeolite or zeolite-like materials, silicalite, zinc sulphide. A porous substrate may also be a fibrous material such as glass fibers, ceramic fibers, carbon fibers, graphite fibers, cellulose fibers, metal fibers, as well as various polymer fibers. All substrates may be produced by methods known in the art.

An example of a porous substrate for use herein comprises circular discs of porous α-alumina (25 mm in diameter, 3 mm thick), comprising a 30 μm thick top layer of 100 nm pores and a 3 mm thick base layer with 3 μm pores. However, a method as provided herein is well suited for substrate materials with a complex geometry, such as multi-channel tubes or honeycombs.

A porous substrate may comprise pore sizes from the nanometer to the micrometer range, such as from 0.9 nm to 10 μm. The support may be multilayered; for example, to improve the mass transfer characteristics of the support, only the surface region of the support in contact with the layer or monolayer of seed crystals may have small diameter pores, while the bulk of the support, toward the surface remote from the layer, may have large diameter pores.

Examples of nonporous substrates for coating with zeolite and/or zeolite-like films include solid silicon wafers, quartz, aluminum oxide, germanium, diamond, zinc sulphide, zinc selenide, zirconium dioxide, aluminium silicate and precious metals. Such substrates may be used in the field of sensor technology.

Said zeolite and/or zeolite-like crystal may be selected from the group comprising silicalite, silicalite-1, zeolite A, zeolite Beta, the zeolites L, Y, X, ZSM-22, ZSM-11, ZSM-5, ZSM-2, LTA, SAPO-34, DDR, mordenite, chabazite, sodalite, ferrierite and phillipsite but is not limited thereto. Further examples thereof are also provided herein.

A zeolite and/or zeolite-like crystal may be silicalite-1.

A hydrophobic substrate with a high contact angle is produced in order to assure that the porous substrate retains its hydrophobicity during the synthesis of the crystalline film from the layer of zeolite and/or zeolite-like crystals deposited on the substrate surface. Suitable chemicals to achieve high hydrophobicity of e.g. hydrophilic metal oxide substrates are the dialkyl dichlorosilanes, such as methyloctyl dichlorosilane, decylmethyl dichlorosilane, dodecyl methyl dichlorosilane, and octadecyl methyldichlorosilane or the alkyl alkoxysilanes, such as octyl trimethoxysilane, decyl trimethoxysilane, dodecyl triethoxysilane, octadecyltrihydrosilane, and cetyl triethoxysilane, or the partially fluorinated or fluorinated alkyl silanes for example, 1H,1H,2H, 2H-Perfluorodecyltriethoxysilane, 1H,1H,2H,2H-Perfluorodecyltrichlorosilane, 1H,1H,2H,2H-Perfluorododecyltriethoxysilane, 1H,1H,2H,2H-Perfluorocetylmethyldichlorosilane 1H,1H,2H,2H-Perfluorooctyltrimethoxysilane, 1H,1H,2H,2H-Perfluorododecyltriethoxysilane, and the like. Collectors such as octylhydroxamate, decylhydroxamate, dodecylhydroxamate, and cetylhydroxamate are also suitable chemicals to achieve high hydrophobicity, especially when the substrate contains Al or Fe atoms and when the alkyl chain is perfluorinated. [Langmuir 1999, 15, 4321-4323].

Further examples of hydrophobic or hydrophobicity adjusting agent(s) comprises one or more silane coupling agent(s) and/or amphiphiles such as alkyl silanes, alkoxy silanes, hydro silanes, chloro silanes, alkylammoniumbromides, alkylammoniumchlorides, cationic polymers, amino silanes, mercapto silanes, or a combination thereof. Accordingly, said hydrophobic agent may be selected from one or more of the following compound(s): 1H, 1H,2H,2H-perfluorodecyltriethoxysilane, octyltrimethoxysilane, 1H,1H,2H, 2H-perfluorocetylmethyldichlorosilane, or a combination thereof.

Compounds or agents are referred to herein as hydrophobic agent(s) or hydrophobicity adjusting agents when used for rendering a surface of a substrate hydrophobic.

Said zeolite and/or zeolite-like crystals may be present in a dispersion when deposited and attached to a surface as presented in the above, e.g. there is also provided a dispersion comprising zeolite and/or zeolite-like crystals which is deposited on a surface as mentioned herein. When deposited is referred to in the present context this includes any kind of provision of the zeolite and/or zeolite-like zeolite crystals or the dispersion contacting them to the substrate in question such as by immersing, dipping or the like of a substrate in crystals or a dispersion containing crystals, or the pouring of a dispersion containing said crystals onto said substrate. Further, a substrate such as a porous substrate may be fully or partly immersed or dipped into a solution or dispersion in a method provided herein. In the present context, synthesis mixture, dispersion or the like is used interchangeably.

Before a substrate such as a porous substrate is rendered hydrophobic in step b) said substrate may be calcined as previously described herein. Calcination is performed to remove any impurities from said substrate before it is treated in a method as provided herein. Calcination may also be performed at the end of the method. Thus, the method described herein may further comprise a step f) following step e): f) calcination.

In the method provided herein, one or more amphiphile(s) may comprise an anion and/or a cation. Such one or more amphiphile(s) may be selected from the group comprising of alkyl ammonium ion(s) such as alkyl ammoniumfluoride, alkyl ammoniumchloride, and/or alkyl ammoniumbromide, salts of carboxylic acids, alkyl sulphates, alkyl sulphonates, alkyl phospates, alkyl phosphonates or a combination thereof. Such one or more amphiphile(s) may also be selected from a group consisting of tetraalkyl ammonium ion(s) such as tetraalkyl ammoniumfluoride, tetraalkyl ammoniumchloride, and/or tetraalkyl ammoniumbromide, or a combination thereof.

In the method provided herein said ionic polymer may be a cationic polymer, such as polymers with various charge density and molecular weight.

In the method as provided herein, said crystals may be treated with one or more composition(s) comprising one or more amphiphile(s) before being provided to the surface of said poroussubstrate. By such a treatment, said crystals are rendered at least partly hydrophobic before being deposited on the surface in step d). Crystals may be rendered at least partly hydrophobic or less hydrophilic by esterification of one or more silanol group(s) of said crystals.

In the method as provided herein the growing in step e) may be performed by bringing a substrate comprising a layer of zeolite and/or zeolite-like crystals in contact with a synthesis solution, gel, or a dispersion, or the like comprising starting material(s) for preparing zeolites and/or zeolite-like crystals to produce the intended framework structure chemically, and any structure-directing agent needed for the synthesis. Thereafter, said zeolite and/or zeolite-like crystals are allowed to grow into a structure, e.g. a crystalline film as provided herein.

Optionally, after step e) said structure or film may be calcined to remove any organic molecules therefrom.

In the method as provided herein, said crystals may be bound to said substrate by hydrophobic interaction.

By a method as provided herein said zeolite and/or zeolite-like crystals form a tightly packed and uniformly spread monolayer on the substrate surface. However, it is also possible to deposit uniform multilayers on the surface.

By a method as provided herein, hydrothermal treatment of said crystals results in the growth of a thin zeolite film, with a thickness of for instance 500 nm on the substrate surface incorporating the (mono)layer of tightly packed zeolite crystals.

By a method as provided herein, there is provided an intergrown thin zeolite film firmly attached to a substrate via a layer or a monolayer of firmly attached zeolite crystals.

There is also provided herein a crystalline film comprising zeolite and/or zeolite-like crystals obtainable by a method provided herein.

There is also provided herein a crystalline structure comprising zeolite and/or zeolite-like crystals obtainable by a method provided herein.

There is also provided herein the use of a crystalline film obtainable by a method as provided herein or a structure or an object comprising a crystalline film obtainable by a method as presented herein and a substrate, as a membrane, catalyst, sensor, adsorbent, and/or an electrode.

There is also provided herein a structure or an object comprising a crystalline film and/or a porous substrate produced according to a method herein. An object or a structure may be exemplified as e.g. a membrane, catalyst, a sensor, or the like.

Further, there is also provided herein the use of a structure or an object, as a membrane, catalyst, sensor, adsorbent, and/or an electrode.

There is also provided herein an object comprising a crystalline film produced by a method as presented herein.

There is also provided herein a porous substrate comprising a crystalline film comprising zeolite and/or zeolite-like crystals obtainable by a method as presented herein.

There is also provided a crystalline film comprising zeolite and/or zeolite-like crystals deposited on a porous substrate, characterized in that the pores of said porous substrate are free from silica species. There is also provided a composite anisotropic membrane comprising said crystalline film comprising zeolite and/or zeolite-like crystals deposited on a porous substrate.

A substrate such as a porous substrate used herein may also be referred to as a support material, despite forming a part of the product which is produced.

The invention is further illustrated in the experimental section but is not intended to be limited thereto.

Further Aspects

In a further aspect there is also provided a method for producing a crystalline film, or a structure comprising a crystalline film, comprising zeolite and/or zeolite-like crystals, said method comprising the steps of: a) providing a substrate, b) rendering at least a part of a surface of said substrate hydrophobic by providing a composition comprising one or more hydrophobic and/or hydrophobicity adjusting agent(s) thereto, c) optionally providing a composition comprising one or more amphiphile(s), and/or a composition comprising one or more ionic polymer(s) to said hydrophobic surface of step b), d) depositing and/or attaching a layer of zeolite and/or zeolite-like crystals on the surface formed in step b) or c), and e) growing a crystalline film comprising said zeolite and/or zeolite-like crystals on said substrate. Said substrate may be a porous or a non-porous substrate.

In still a further aspect there is provided a method for producing a crystalline film comprising zeolite and/or zeolite-like crystals on a substrate, said method comprising the steps of:
a) providing a porous substrate,
b) rendering at least a part of a surface of said substrate hydrophobic by providing a composition comprising one or more hydrophobic agent(s) thereto,
c) providing a composition comprising one or more amphiphile(s), and/or a composition comprising one or more ionic polymer(s) to the hydrophobic surface in b),
d) depositing and attaching a layer of zeolite and/or zeolite-like crystals on the surface formed in step b) or c), and
e) growing a crystalline film comprising zeolite and/or zeolite-like crystals by hydrothermal treatment of said layer of zeolite and/or zeolite-like crystals on said porous and hydrophobic substrate.

In still a further aspect there is provided a method for producing a crystalline film comprising zeolite and/or zeolite-like crystals on a substrate, said method comprising the steps of:
a) providing a porous substrate,
b) rendering at least a part of a surface of said porous substrate hydrophobic by providing a composition comprising one or more hydrophobic agent(s) thereto,
c) providing a composition comprising one or more hydrophobicity adjusting agent(s), such as a composition comprising one or more amphiphile(s) and/or a composition comprising one or more ionic polymer(s) to said hydrophobic surface, d) depositing and attaching a layer of zeolite and/or zeolite-like crystals on the surface formed in step b) or c), and e) growing a crystalline film comprising zeolite and/or zeolite-like crystals by hydrothermal treatment of said layer of zeolite and/or zeolite-like crystals on said porous and hydrophobic substrate.

Hence, if both a composition comprising one or more amphiphile(s) and a composition comprising one or more ionic polymer(s) is to be added to a hydrophobic surface of a porous or non-porous substrate this may be performed in subsequent steps.

In still a further aspect there is provided a method for producing a crystalline film comprising zeolite and/or zeolite-like crystals on a substrate, said method comprising the steps of:

a) providing a porous substrate, b) rendering at least a part of a surface of said substrate hydrophobic by providing a composition comprising one or more hydrophobic agent(s) thereto, c) providing a composition comprising one or more hydrophobicity adjusting agent(s), such as a cationic polymer, to said hydrophobic surface, d) depositing and attaching a layer of zeolite and/or zeolite-like crystals on the surface formed in step c), and e) growing a crystalline film comprising zeolite and/or zeolite-like crystals by hydrothermal treatment of said layer of zeolite and/or zeolite-like crystals on said porous and hydrophobic substrate.

In still a further aspect there is provided a method for producing a crystalline film comprising zeolite and/or zeolite-like crystals on a substrate, said method comprising the steps of:

a) providing a porous substrate, b) rendering at least a part of a surface of said substrate hydrophobic by providing a composition comprising one or more hydrophobic and/or hydrophobicity adjusting agent(s) thereto, c) providing a composition comprising one or more ionic polymer(s), such as a cationic polymer, to the surface formed in step b), d) depositing and attaching a layer of zeolite and/or zeolite-like crystals on the surface formed in step c) and e) growing a crystalline film comprising zeolite and/or zeolite-like crystals by hydrothermal treatment of said layer of zeolite and/or zeolite-like crystals on said porous and hydrophobic substrate.

In still a further aspect there is provided a method for producing a crystalline film comprising zeolite and/or zeolite-like crystals on a substrate, said method comprising the steps of:

a) providing a porous substrate, b) rendering at least a part of a surface of said substrate hydrophobic by providing a composition comprising one or more hydrophobic agent(s) thereto, c) providing a composition comprising one or more silane(s), such as an aminosilane, to said hydrophobic surface, d) depositing and attaching a layer of zeolite and/or zeolite-like crystals on the surface formed in step c), and e) growing a crystalline film comprising zeolite and/or zeolite-like crystals by hydrothermal treatment of said layer of zeolite and/or zeolite-like crystals on said porous and hydrophobic substrate.

In still a further aspect there is provided a method for producing a crystalline film comprising zeolite and/or zeolite-like crystals on a substrate, said method comprising the steps of:

a) providing a porous substrate, b) rendering at least a part of a surface of said substrate hydrophobic by providing a composition comprising one or more hydrophobic agent(s) thereto, c) providing a composition comprising one or more amphiphile(s), such as an anionic amphiphile, to said hydrophobic surface in step b, d) providing a composition comprising one or more ionic polymer(s), such as a cationic polymer, to the surface formed in step c), e) depositing and attaching a layer of zeolite and/or zeolite-like crystals on the surface formed in step d), and f) growing a crystalline film comprising zeolite and/or zeolite-like crystals by hydrothermal treatment of said layer of zeolite and/or zeolite-like crystals on said porous and hydrophobic substrate.

Hence, if both a composition comprising one or more amphiphile(s) and a composition comprising one or more ionic polymer(s) is to be added to a hydrophobic surface of a substrate this may be performed in subsequent steps.

In still a further aspect there is provided a method for producing a crystalline film comprising zeolite and/or zeolite-like crystals on a substrate, said method comprising the steps of:

a) providing a porous substrate, b) rendering at least a part of a surface of said substrate hydrophobic by providing a composition comprising one or more hydrophobic agent(s) thereto, c) treating zeolite and/or zeolite-like crystals with one or more composition(s) comprising one or more amphiphile(s), d) depositing and attaching a layer of zeolite and/or zeolite-like crystals obtained in step c) on the hydrophobic surface in step b), and e) growing a crystalline film comprising zeolite and/or zeolite-like crystals by hydrothermal treatment of said layer of zeolite and/or zeolite-like crystals on said porous and hydrophobic substrate.

Before a porous substrate is rendered hydrophobic in step b) said substrate may be calcined as previously described herein. Calcination is performed to remove any impurities from said substrate before it is treated in a method as provided herein.

In still a further aspect there is provided a method wherein step b) further comprises the steps of:

i) immersing said porous substrate in a solution comprising a hydrophobic agent, ii) rinsing said substrate in a solution/solvent, and iii) drying said porous substrate.

Step i) may be performed for about 0.1 to 5 hours, about 0.1 to 10 hours, or about 0.1 to 16 hours, such as for about 0.5, 1, 2, 3, 4, or 5 hours.

Step ii) may be performed for about 0.5 to 3 hours, such as about 0.5 to 5 hours or about 0.5 to 10 hours, such as for about 0.5, 1, 2, 3, 4, or 5 hours.

Rinsing is performed to remove substantially all of any non-reacting agents.

Said solution may be an aqueous or non-aqueous solution.

It is also provided herein, a method wherein step b) further comprises the steps of:

i) immersing said porous substrate in a solution comprising a first hydrophobic agent, ii) rinsing said substrate in a solution/solvent,
iii) immersing said porous substrate in a solution comprising a second hydrophobic and/or hydrophobicity adjusting agent, and
iv) rinsing and/or maintaining said porous substrate in a solvent/solution.

Step i) may be performed for about 0.1 to 5 hours, about 0.1 to 10 hours, or about 0.1 to 16 hours, such as for about 0.5, 1, 2, 3, 4, or 5 hours.

Step ii) may be performed for about 0.5 to 3 hours, about 0.5 to 5 hours or about 0.5 to 10 hours.

Said first hydrophobic agent may be the same or different from a second hydrophobic agent. As an example, a first hydrophobic agent may be trimethoxyoctylsilane and a second hydrophobic and/or hydrophobicity adjusting agent may be 1H,1H,2H,2H-perfluorocetylmethyldichlorosilane.

Step a) and step b) of the method as disclosed herein, may also be referred to as a method for producing a hydrophobic substrate or a masking method or procedure. Examples of such a method (step b) for producing a hydrophobic substrate or a masking method or procedure are provided in steps i) to iii) and i) to iv) herein. Accordingly, there is also provided herein a method for producing a hydrophobic substrate comprising steps a) and b) as referred to herein, as well as to a hydrophobic substrate obtainable by such a method, and its use.

Accordingly, there is also provided herein an intermediate product obtainable by a method comprising steps a) and b) exemplified by (step b) steps i) to iii) and i) to iv) herein.

Said solution may be an alcohol, such as ethanol or propanol, but is not limited thereto.

EXPERIMENTAL SECTION

Example 1

A circular disc of porous α-alumina (25 mm in diameter, 3 mm thick), provided with a 30 μm thick top layer of 100 nm pores and a 3 mm thick base layer with 3 μm pores was calcined in air at 500° C. for 5 hours to remove any organic substances that might affect the interaction between α-alumina and chemicals used in the subsequent steps. The substrate was immersed into a 2.5 weight percent ethanol solution of 1H,1H,2H,2H-perfluorodecyltriethoxysilane for 16 hours. Subsequently, the substrate was dipped into ethanol (99.9%) and then placed in a beaker containing 99.9% ethanol. The total time in ethanol was 5 hours and the ethanol was replaced by new ethanol every hour. After drying for 1 hour at 105° C., the contact angle between a droplet (4 μL) of milliQ water and the substrate was measured with a FibroDat 1121/1122 system equipped with a CCD camera. As shown in FIG. 1, the measured contact angle reached an equilibrium value after about 1 second of contact between the water droplet and the substrate. The value of the contact angle at equilibrium was larger than 125°, which implies that the surface modified substrate was hydrophobic. The contact angle of the calcined substrate, before surface modification, was too low to be measured by the FibroDat system)(<10°. The droplet was absorbed by the substrate.

Example 2

Figure 2:
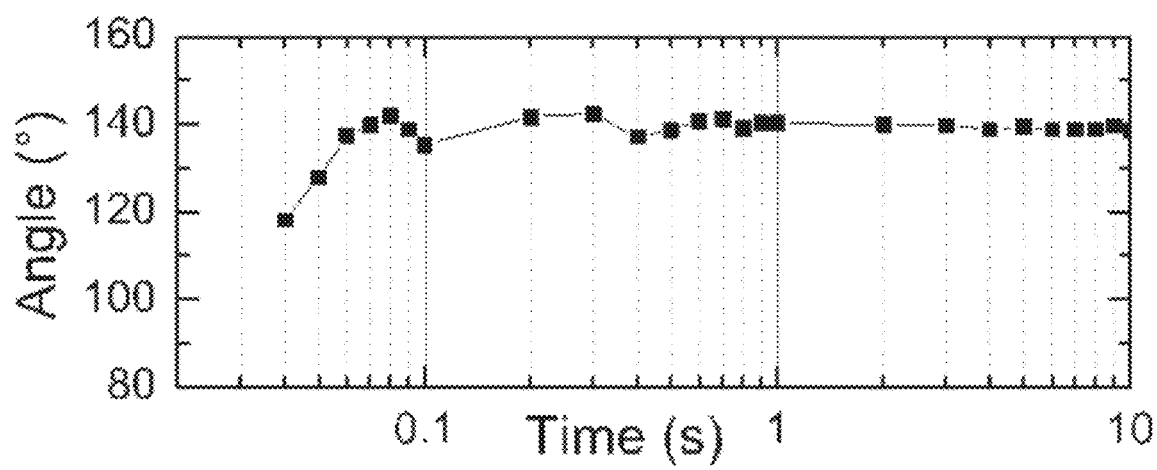
FIG. 2. The time dependence of the contact angle between water and the porous α-alumina substrate according to Example 2.

A porous α-alumina substrate, as described in Example 1, was calcined in air at 500° C. for 5 hours. The substrate was exposed to an ethanol solution containing five weight percent trimethoxyoctylsilane, for 30 minutes, rinsed with ethanol (99.9%) for 10 minutes, and then exposed to a 5 weight percent ethanol solution of 1H,1H,2H,2H-perfluoro cetylmethyldichlorosilane for 30 minutes and subsequently placed in a beaker containing ~100 mL 99.9% ethanol for 30 minutes. After drying for 1 hour at 105° C., the contact angle between a droplet (4 μL) of milliQ water and the substrate was measured with a FibroDat 1121/1122 system equipped with a CCD camera. As shown in FIG. 2, the measured contact angle reached an equilibrium value after about 1 second of contact between the water droplet and the substrate. The contact angle at equilibrium was larger than 135°, whilst the contact angle of the calcined substrate was too low to be measured.

Example 3

Figure 3:
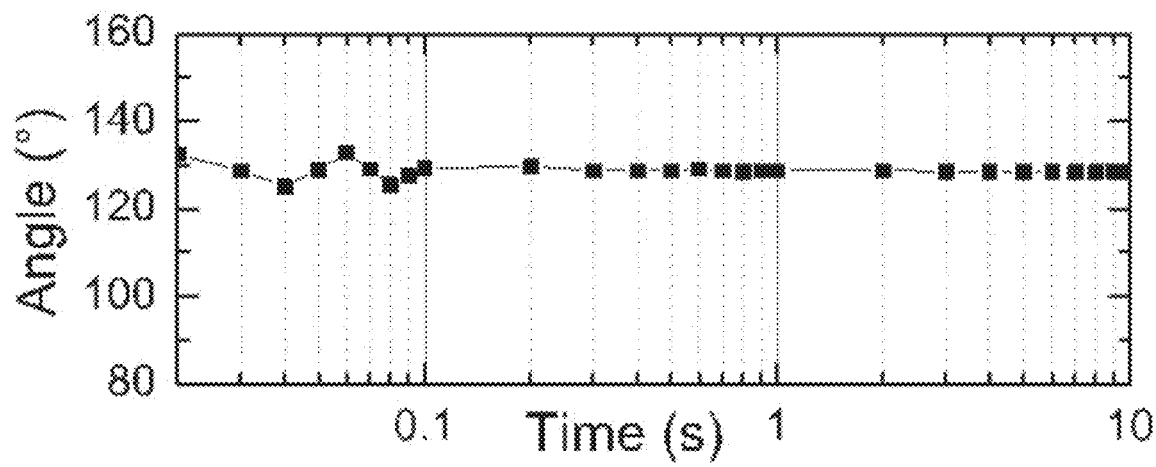
FIG. 3. The time dependence of the contact angle between water and the porous α-alumina substrate according to Example 3.

A porous α-alumina substrate, as described in Example 1, was calcined in air at 500° C. for 5 hours. The calcined substrate was surface modified using 1H,1H,2H,2H-perfluoro decyltriethoxysilane by immersing the substrate in a solution containing 2.5 weight percent of the carbonfluoro compound dissolved in ethanol. The immersion time was 1 hour. After keeping the substrate in 99.9% ethanol for 8 hours, it was dried in a vacuum desiccator. The contact angle was measured with the FibroDat system described in Examples 1 and 2. The measured contact angle as function of time is shown in FIG. 3.

Example 4

Figure 4:
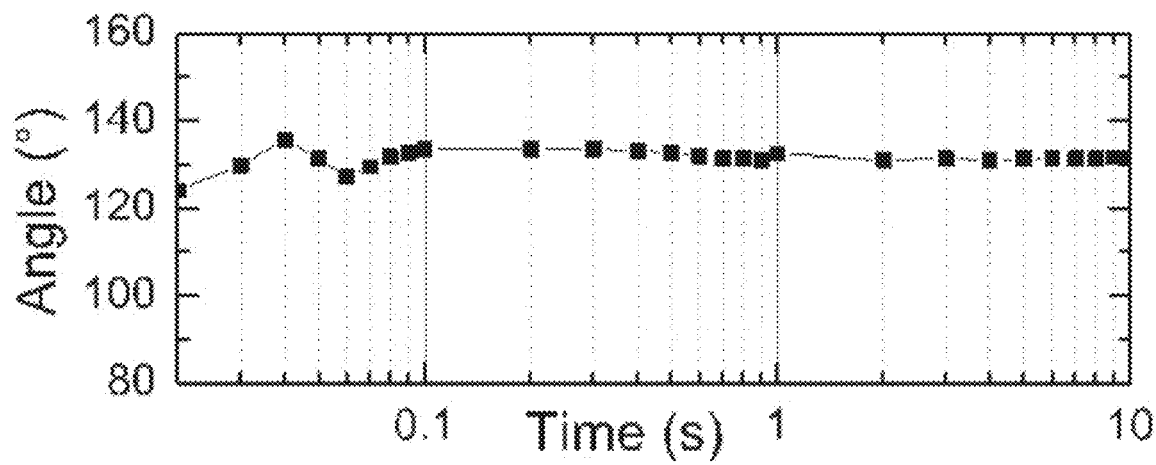
FIG. 4. The time dependence of the contact angle between water and the porous α-alumina substrate according to Example 4.

A porous α-alumina substrate, as described in Example 1, was calcined in air at 500° C. for 5 hours. The calcined substrate was immersed in 2.5 weight percent of 1H,1H,2H,2H-perfluoro decyltriethoxysilane in ethanol as solvent. The immersion time was 1 hour. After this period of time, the substrate was dipped into 99.9% ethanol and placed in a beaker with 100 mL ethanol (99.9%) for 2 hours. The substrate was then dried for 60 minutes in an oven set to 60° C. ° C. The value of the equilibrium contact angle was larger than 125°, as shown in FIG. 4.

Example 5

Figure 5:
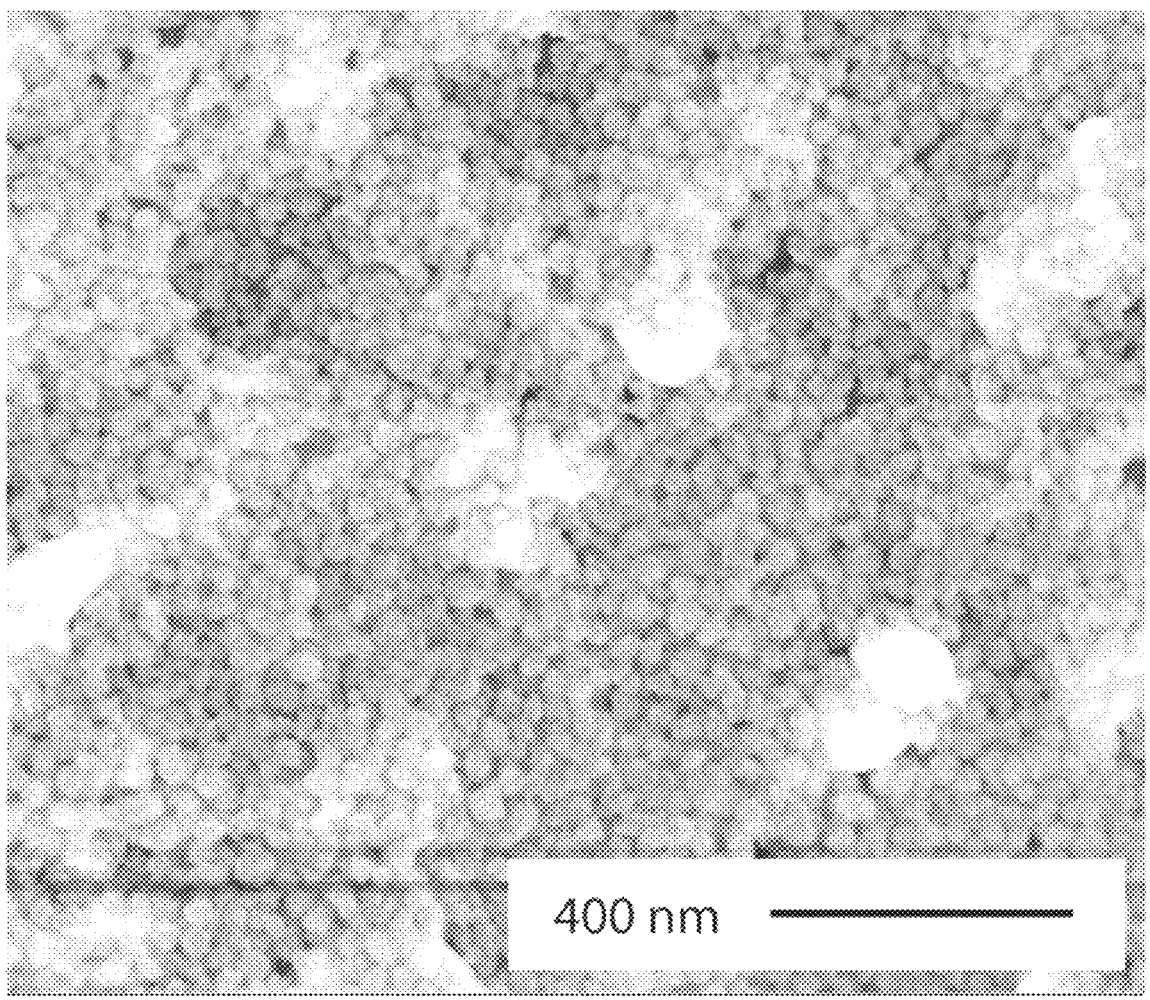
FIG. 5. Scanning Electron Microscopy (SEM) image of silicalite-1 crystals forming a monolayer on a porous α-alumina substrate made hydrophobic according to Example 1. The method applied to deposit the monolayer onto the substrate was explained in Example 5. The cumulative average of the diameter of the silicalite-1 crystals was 51 nm.

A porous α-alumina substrate, as described in Example 1, was calcined in air at 500° C. for 5 hours. The surface of the porous substrate was made hydrophobic using 1H,1H,2H,2H-perfluorodecyltriethoxysilane according to the method described in Example 1. The hydrophobic substrate was immersed in a solution containing one weight percent of a cationic polymer (Poly(dimethylamine-co-epichlorhydrin-co-ethylenediamine) with an average molecular weight of 75000, from Aldrich) dissolved in aqueous ammonia (pH=10). After 10 minutes in the aqueous polymer solution, the substrate was rinsed in 0.1 M aqueous ammonia solution and subsequently immersed in one weight percent aqueous dispersion containing 1 wt.-% silicalite-1 crystals with an average diameter of about 50 nm. Deposition of the crystals onto the substrate surface was allowed to proceed for 10 minutes. After rinsing with 0.1 M aqueous ammonia, the substrate was calcined in air at 500° C. for 3 hours. The monolayer deposition of the molecular sieve crystals onto the substrate surface was examined with Scanning Electron Microscopy (SEM) using a FEI Magellan 400 field emission instrument. The sample was not coated in order to improve the conductivity before the SEM image was recorded. As shown in FIG. 5, the substrate surface was covered with a monolayer of adsorbed silicalite-1 crystals except for a few very small spots where the crystals did not completely cover all parts of the surface.

Example 6

Figure 6:
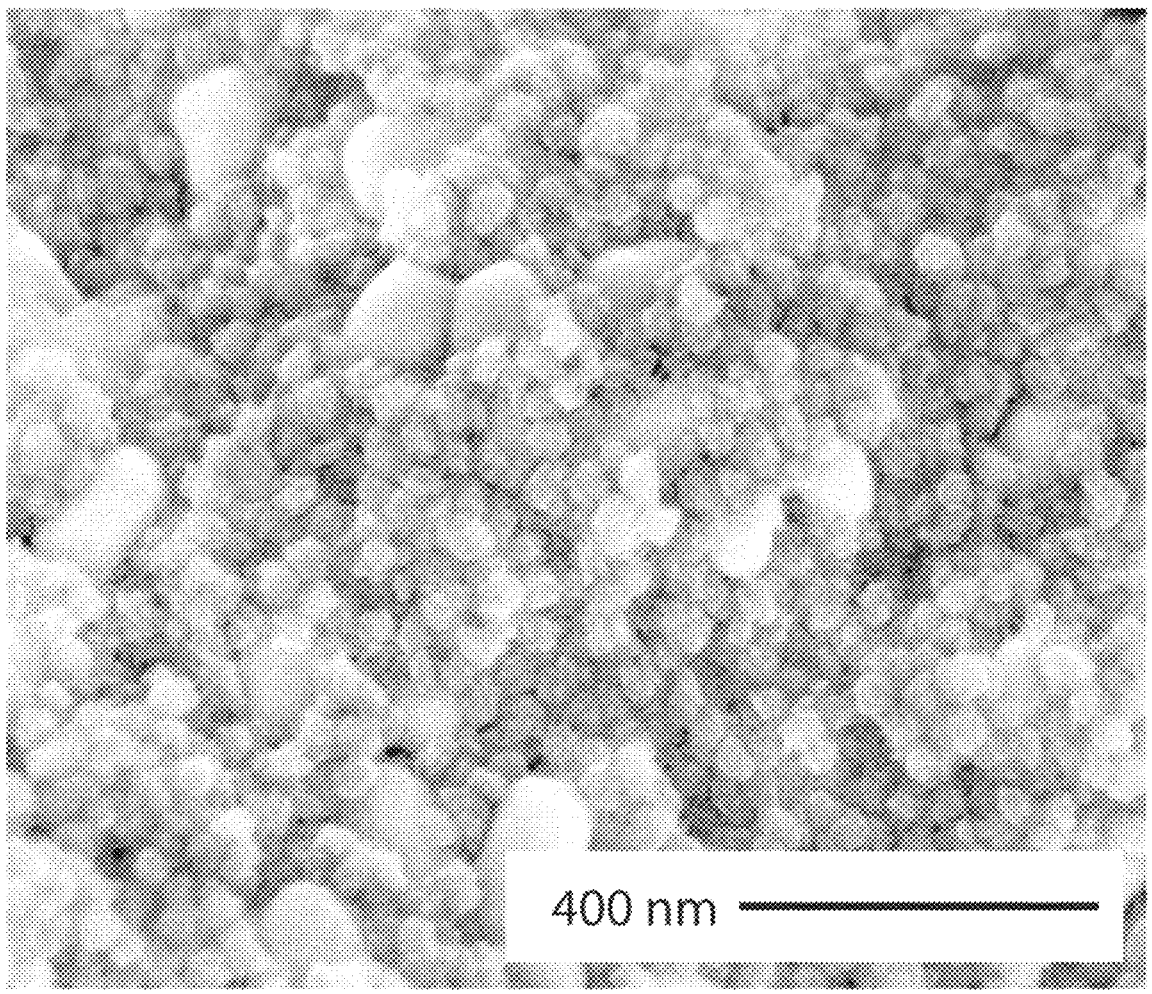
FIG. 6. SEM image of silicalite-1 crystals forming monolayer on a porous α-alumina substrate hydrophobized according to Example 2. The method applied to deposit the monolayer onto the substrate was explained in Example 6. The diameter of the silicalite-1 crystals was about 70 nm.

A porous α-alumina substrate, described in Example 1, was calcined in air at 500° C. for 5 hours. The substrate was made hydrophobic using a combination of trimethoxyoctylsilane and the fluorocarbon substance 1H,1H,2H,2H-perfluorocetylmethyldichlorosilane, according to the method described in Example 2. The surface of the porous hydrophobic substrate was then further modified by immersing it for 20 minutes in 80 mM aqueous solution of decyltrimethylammonium bromide containing 5 weight percent ethanol. After surface modification with the ammonium bromide, the substrate was placed in a beaker with distilled water for 5 minutes and subsequently immersed in a 1 weight-percent aqueous dispersion containing silicalite-1 crystals with an average diameter of about 50 nm. Deposition of the crystals onto the substrate surface was allowed to proceed for 5 minutes. After rinsing with 0.1 M aqueous ammonia, the substrate was calcined in air at 500° C. for 5 hours. The monolayer deposition of the molecular sieve crystals onto the substrate surface was examined with Scanning Electron Microscopy using a FEI Magellan 400 field emission instrument. The sample was not coated in order to improve the conductivity before the SEM image was recorded. As shown in FIG. 6, the substrate surface was covered with a monolayer of adsorbed silicalite-1 crystals.

Example 7

Figure 7:
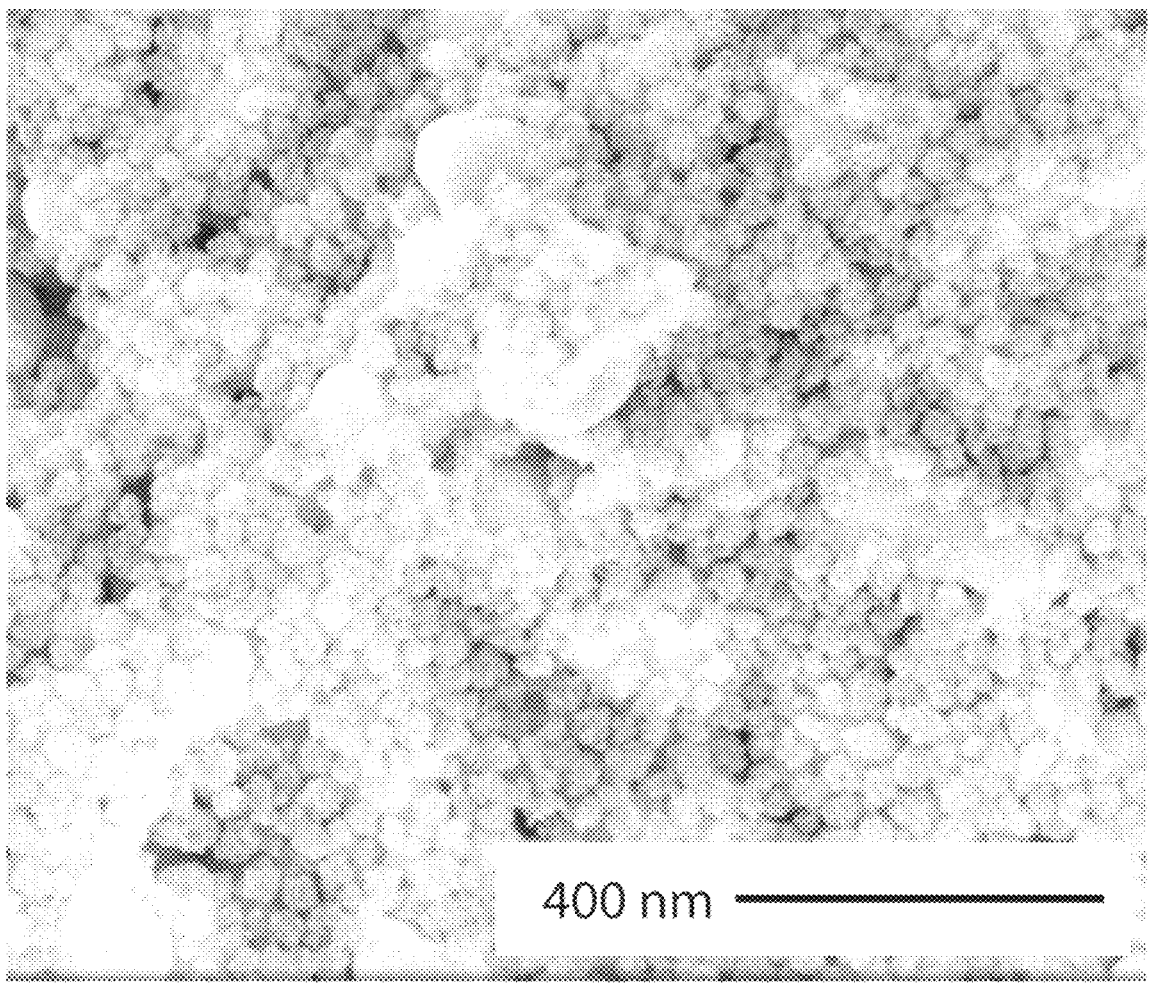
FIG. 7. SEM image of silicalite-1 crystals forming monolayer on a porous α-alumina substrate made hydrophobic according to Example 3. The method applied to deposit the monolayer onto the substrate was explained in Example 7. The cumulative average of the diameter of the silicalite-1 crystals was 51 nm.

A porous α-alumina substrate, described in Example 1, was calcined in air at 500° C. for 5 hours. The substrate was made hydrophobic by immersing it in a 2.5 weigh percent ethanol solution of the fluorocarbon 1H,1H,2H,2H-perfluorodecyltriethoxysilane according to the method described in Example 3. The surface of the porous hydrophobic substrate was now modified by immersing it for 20 minutes in 40 mM aqueous solution of decyltrimethylammonium bromide. The latter modification was preceded by dipping the substrate in ethanol (99.9%) and letting the outermost part of the surface evaporate excess ethanol. The latter procedure improved the wetting properties of the hydrophobic surface. After treatment with the quaternary ammonium solution, the substrate was rinsed with 0.01 M aqueous $NH_3$ solution and immersed in one weight-percent aqueous dispersion of silicalite-1 crystals with an average diameter of about 50 nm. Deposition of the crystals onto the substrate surface was allowed to proceed for 10 minutes. After rinsing with 0.01 M aqueous ammonia, the substrate was calcined in air at 500° C. for 3 hours. The monolayer deposition of the molecular sieve crystals onto the substrate surface was examined with Scanning Electron Microscopy using a FEI Magellan 400 field emission instrument. The sample was not coated in order to improve the conductivity before the SEM image was recorded. As shown in FIG. 7, the substrate surface was covered with a monolayer of adsorbed silicalite-1 crystals.

Example 8

Figure 8:
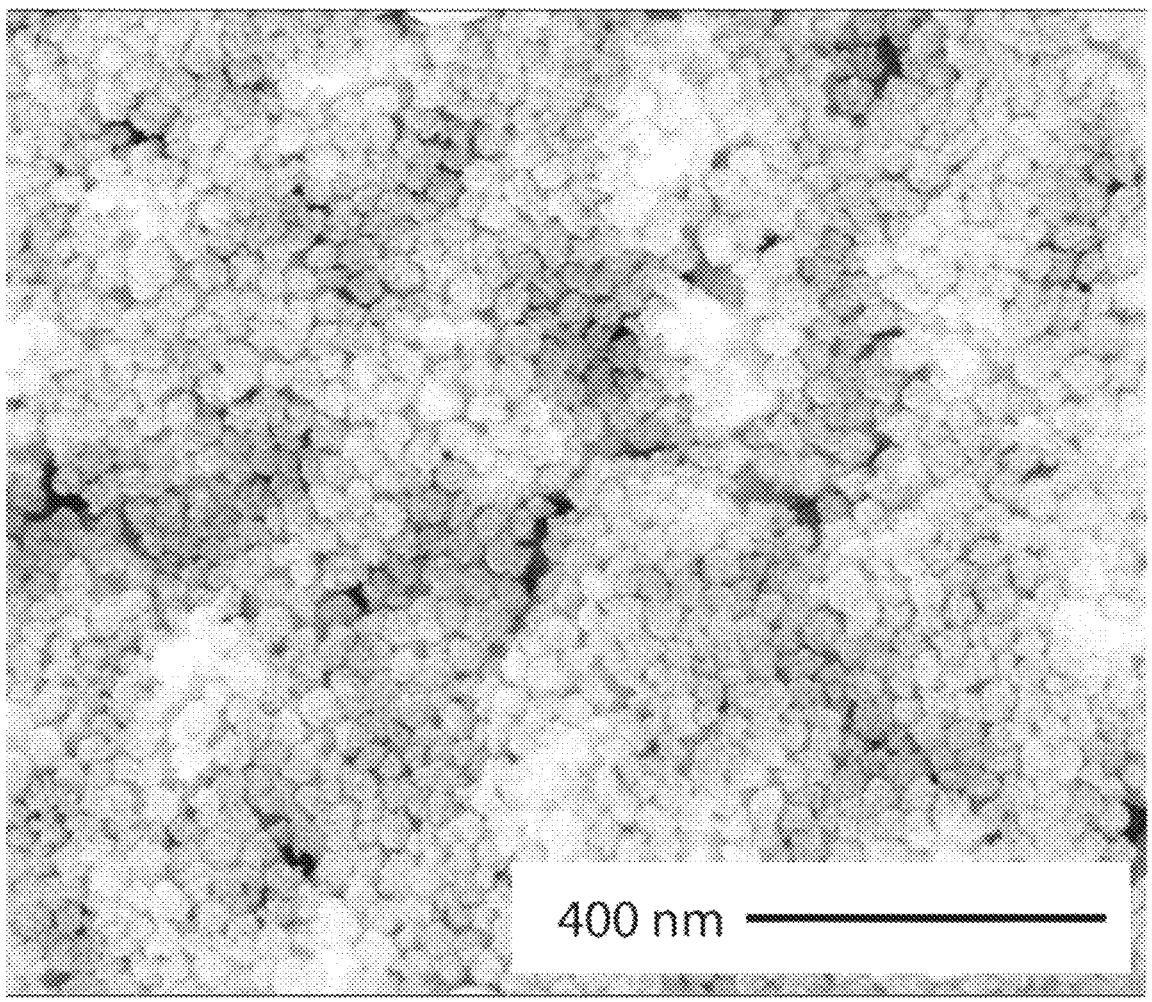
FIG. 8. SEM image of silicalite-1 crystals forming monolayer on a porous α-alumina substrate made hydrophobic according to Example 3. The method applied to deposit the monolayer onto the substrate was explained in Example 8. The cumulative average of the diameter of the silicalite-1 crystals was 51 nm.

A porous α-alumina substrate, described in Example 1, was calcined in air at 500° C. for 5 hours. The substrate was made hydrophobic according to the method described in Example 3 and subsequently dipped into ethanol (99.9%). After the ethanol had evaporated from the outermost part of the substrate surface, the substrate was immersed in one weight percent silicalite-1 dispersion. The silicalite-1 dispersion was prepared by mixing 20 parts by volume of 5 weight percent aqueous silicalite-1 dispersion with 70 parts by volume 0.1 M aqueous $NH_3$ and 10 parts by volume 40 mM aqueous decyltrimethylammonium bromide. The dispersion formed was allowed to equilibrate during 5 minutes with stirring and subsequently the substrate was brought in contact with the dispersion for 5 minutes. After rinsing with 0.01 M aqueous ammonia, the substrate was calcined in air at 500° C. for 3 hours. The monolayer deposition of the molecular sieve crystals onto the substrate surface was examined with Scanning Electron Microscopy using a FEI Magellan 400 field emission instrument. The sample was not coated in order to improve the conductivity before the SEM image was recorded. As shown in FIG. 8, the substrate surface was covered with a monolayer of adsorbed silicalite-1 crystals.

Example 9

Figure 9:
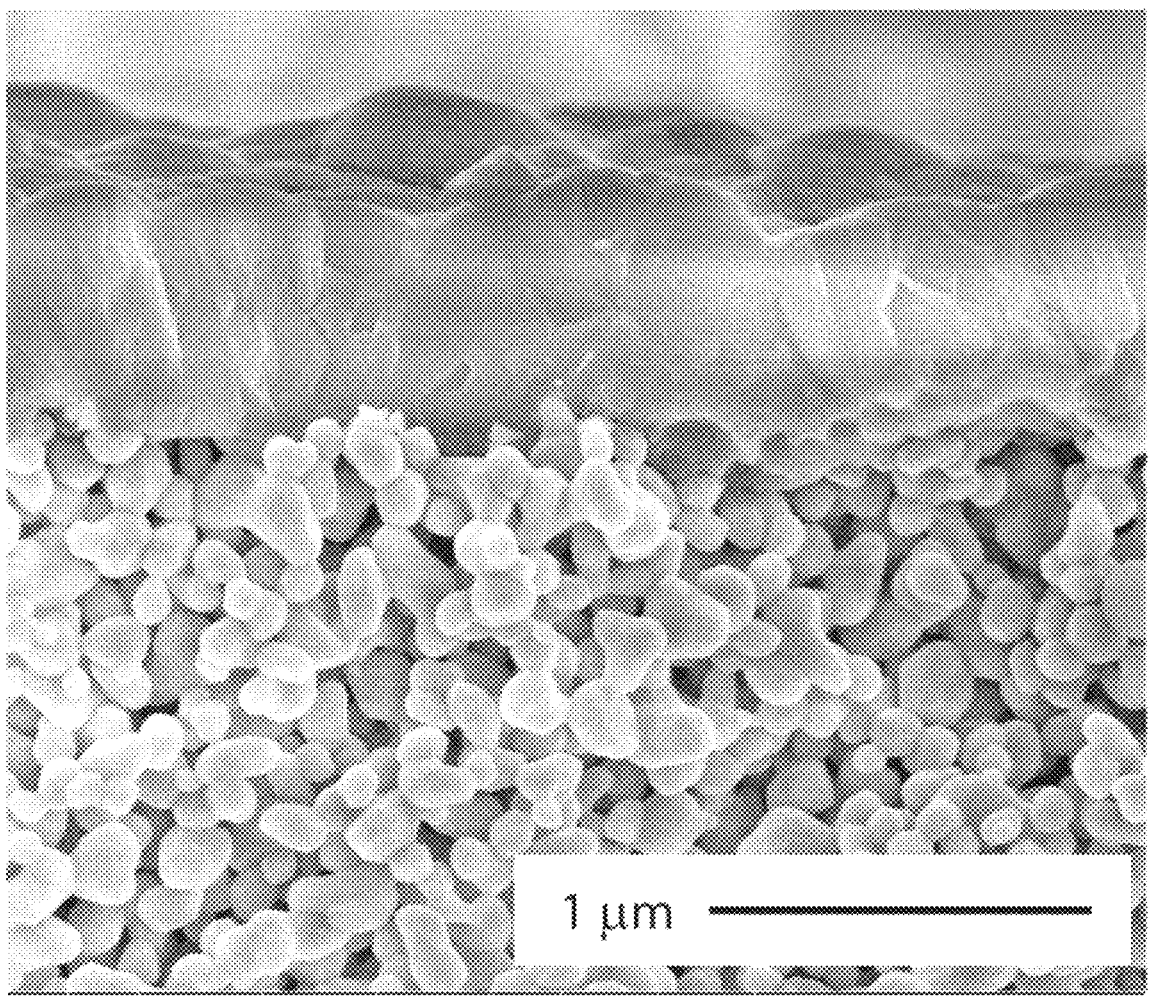
FIG. 9. SEM image of a silicalite-1 membrane synthesized on the top layer of a porous α-alumina substrate made hydrophobic according to Example 1. A monolayer of silicalite-1 crystals was deposited according to the method explained in Example 5, before the membrane was synthesized according to the method described in Example 9. No support invasion was detected.

A porous α-alumina tube with geometry; L=100 mm, Douter=10 mm, and Dinner=7 mm, was calcined in air at 500° C. The tube was provided with a 30 μm thick inner layer with 100 nm pores and an outer layer with 3 μm pores. The tube was made hydrophobic according to Example 1, except that the immersion time in the ethanol solution containing 2.5 weight percent 1H,1H,2H,2H-perfluorodecyltriethoxysilane was 4 hours. After drying, the inner surface of the hydrophobic tube was treated with a solution containing one weight percent of a cationic polymer (Poly (dimethylamine-co-epichlorhydrin-co-ethylenediamine) with an average molecular weight of 75000, from Aldrich) dissolved in aqueous ammonia (pH=11). After 10 minutes in the aqueous polymer solution, the inner surface of the tube was rinsed with 0.1 M aqueous ammonia solution and subsequently treated with one weight percent aqueous dispersion containing silicalite-1 crystals with an average diameter of about 50 nm. Deposition of the crystals onto the substrate surface was allowed to proceed for 10 minutes. After rinsing with 0.1 M aqueous ammonia, the support was immersed in synthesis solution with the molar composition: 50 $SiO_2$: 6 TPAOH: 1 $Na_2O$: 3000 $H_2O$. The silicalite-1 film was grown by hydrothermal treatment at 95° C. for 28 hours. After cooling, the sample was rinsed with 0.1 M aqueous $NH_3$ to remove loosely bound crystals and oligomers from the surface of the membrane. A representative Scanning Electron Microscopy image of the cross section of the calcined membrane is shown in FIG. 9. As illustrated by the Figure, the pores of the support are fully open and no invasion of the support has occurred. No zeolite invasion of the support could be detected by recording numerous SEM images at various locations of the cross section, implying that synthesis solution could not penetrate through the hydrophobic barrier of the support.

Example 10

Figure 10:
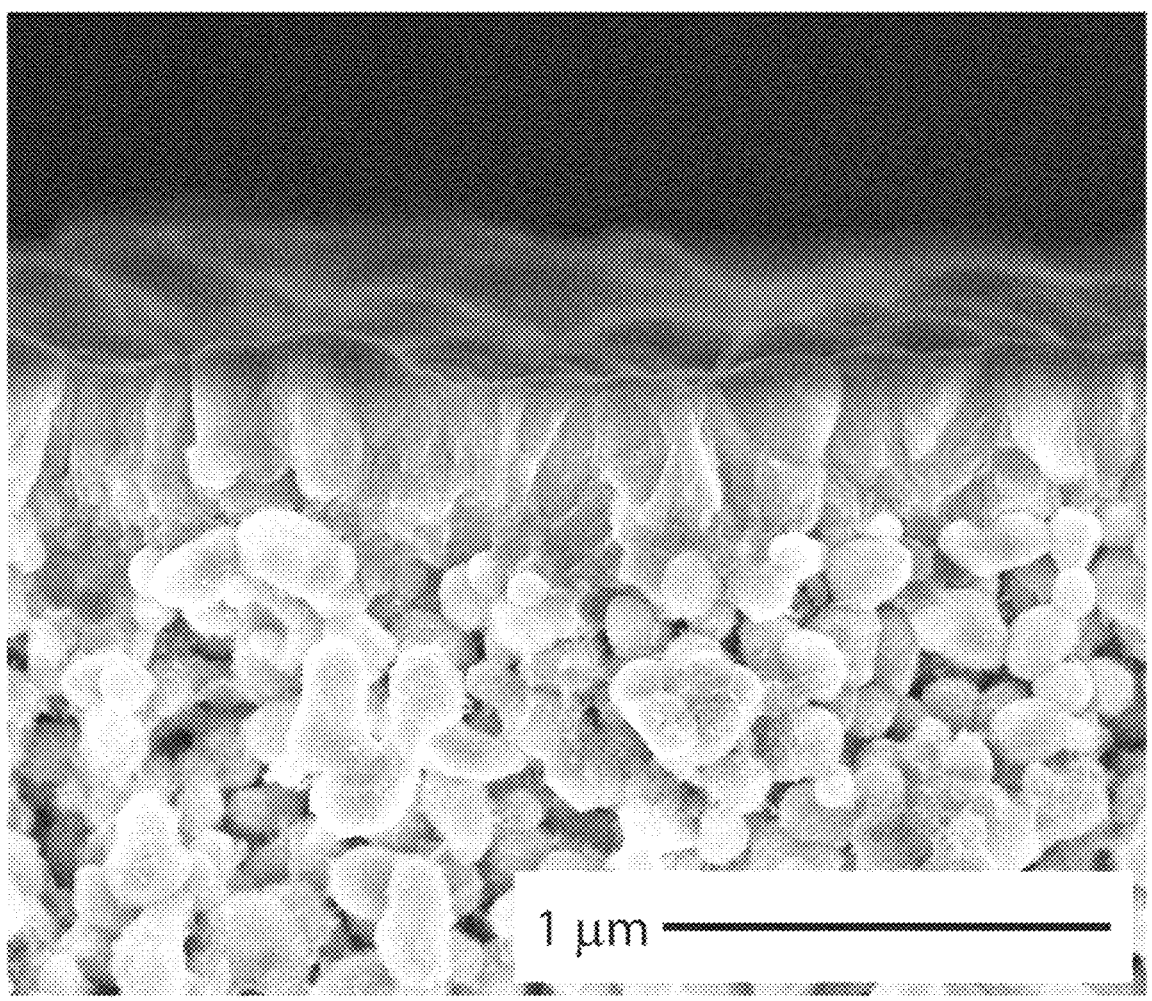
FIG. 10. SEM image of a silicalite-1 membrane synthesized on the top layer of a porous α-alumina substrate according to a masking method well-known in the art (WO 00/53298), implying that the surface of 100 nm pores in the top layer of the substrate was filled with poly (methyl methacrylate), as a first step, and as a second step the remainder of the substrate was filled with hydrocarbon wax. After removing poly (methyl methacrylate) from the first step, a monolayer of silicalite-1 crystals was deposited onto the top layer after charge reversing the substrate using a cationic polymer and subsequently the membrane was synthesized according to the method described in Example 10. Support invasion was clearly detected.

A porous α-alumina support, as described in Example 1, was thoroughly rinsed with acetone, ethanol and 0.1 M aqueous ammonia to remove dust and any organic molecules attached to the surface of the substrate. The support was then treated by a masking procedure known in the art (WO 00/53298) involving two steps; the first step implies that the top surface of the 100 nm pores was coated with a thin layer of poly (methyl methacrylate), in the second step the remainder of the support was filled with hydrocarbon wax. Subsequently, the entire poly (methyl methacrylate) was dissolved in acetone and the surface rinsed with 0.1 M aqueous $NH_3$ before the support was treated with 1 weight percent aqueous cationic polymer (Poly(dimethylamine-co-epichlorhydrin-co-ethylenediamine) with an average molecular weight of 75000, from Aldrich) solution in order to reverse the charge of the support surface. Seeding of the support surface was accomplished by immersion of the support in 1 weight percent silicalite-1 dispersion for 10 minutes. After seeding, the support was rinsed four times with 0.1 M aqueous $NH_3$ to remove excess seed crystals. The seeded support was immersed in a synthesis solution with the composition: 25 $SiO_2$: 3 TPAOH: 100 EtOH: 1500 $H_2O$ and hydrothermally treated in an oil bath at 100° C. for 36 hours. After cooling, the sample was rinsed with 0.1 M aqueous $NH_3$ to remove loosely bound crystals and oligomers from the surface of the membrane. A representative Scanning Electron Microscopy image of the cross section of the calcined film is shown in FIG. 10. Invasion from the synthesis solution could be detected; implying that poly (methyl methacrylate) penetrated into the 100 nm pores or the hydrocarbon wax did not reach completely up to the poly (methyl methacrylate) coating. Invasion makes it difficult to optimize the thickness of the membrane and influences negatively the permeation through the membrane.

Example 11

A porous α-alumina substrate, described in Example 1, was calcined in air at 500° C. for 5 hours. The substrate was made hydrophobic according to the method described in Example 3 and subsequently dipped into ethanol (99.9%). The substrate was then placed in a beaker containing about 50 mL ethanol for 1.5 hours. The ethanol was replaced once during this time. Ethanol was then evaporated from the substrate pores by drying in a vacuum desiccator for 2 hours. The top surface of the hydrophobic substrate was then further rinsed by immersing the substrate in a 0.001 M NaOH solution and placing this beaker in an oven set to 90° C. for 1.5 hours. The substrate was subsequently dipped in water and then immersed in ethanol. After this, the substrate was immersed in a solution containing one weight percent of a cationic polymer (Eka ATC 4150, Eka Chemicals AB, Sweden) dissolved in aqueous ammonia (pH=10). After 10 minutes in the aqueous polymer solution, the substrate was rinsed with 0.1 M aqueous ammonia solution and subsequently treated with one weight percent aqueous dispersion containing silicalite-1 crystals with an average diameter of about 50 nm. Deposition of the crystals onto the substrate surface was allowed to proceed for 10 minutes. After rinsing with 0.1 M aqueous ammonia, the substrate was left to dry over night. The seeded substrate was then immersed in a synthesis solution with the composition: 25 $SiO_2$: 3 TPAOH: 100 EtOH: 1450 $H_2O$ and hydrothermally treated in an oil bath at 88° C. for 71 hours. After cooling, the thin-film composite anisotropic membrane was rinsed with 0.1 M aqueous ammonia to remove loosely bound crystals and oligomers from the surface of the membrane. After calcination at 500° C., the membrane was mounted in a stainless steel cell using graphite gaskets. Adsorbed components were then removed from the membrane by drying at 300° C. in a flow of helium. After cooling to room temperature, an equimolar mixture of hydrogen and carbon dioxide with a total flow rate of 15 NL/min was fed to the membrane at varying feed pressures. The composition of the permeate stream was analyzed using a mass spectrometer (InProcess Instruments GmbH, GAM 400). The pressure of the permeate stream was atmospheric, and the gas flow of the permeate stream was measured using a drum-type gas meter (Ritter Apparatebau GmbH). The separation properties of the membrane were investigated at two membrane temperatures; 21.5° C. and 1.1° C. Due to a low film thickness and a low amount of support invasion, the observed flux is as high as 635 kg $m^{-2}$ $h^{-1}$ at 21.5° C. and 550 kg $m^{-2}$ $h^{-1}$ at 1.1° C. at a feed pressure of 9 bar. These fluxes are much higher than for membranes masked with wax at comparable conditions [Very high flux MFI membrane for CO2 separation, Sandström, L., Sjöberg, E. & Hedlund, J. Journal of Membrane Science. 380, 232-240 (2011)]. The observed carbon dioxide/hydrogen separation factor, α, is defined as $\alpha=(y_i/y_j)/(x_i/x_j)$, where $y_i$ is the molar fraction of component i in the permeate stream and $x_i$ is the molar fraction of component i in the calculated average of the feed and retentate streams. The membrane is clearly selective towards carbon dioxide, with a separation factor of 14.5 at a feed pressure of 9 bar and a temperature of 1.1° C.

Example 12

A porous α-alumina substrate, as described in Example 1, was calcined in air at 500° C. for 5 hours. The calcined substrate was immersed in 34 mM ethanol solution of potassium dodecylhydroxamate for 1 hour. After this period of time, the substrate was rinsed with 99.7% ethanol and placed in a beaker with 100 mL ethanol (99.7%) for 1 hour. The substrate was then dried for 60 minutes in an oven set to 70° C. The average value of the measured equilibrium contact angle was stable at 120°±1°.

Example 13

Figure 11:
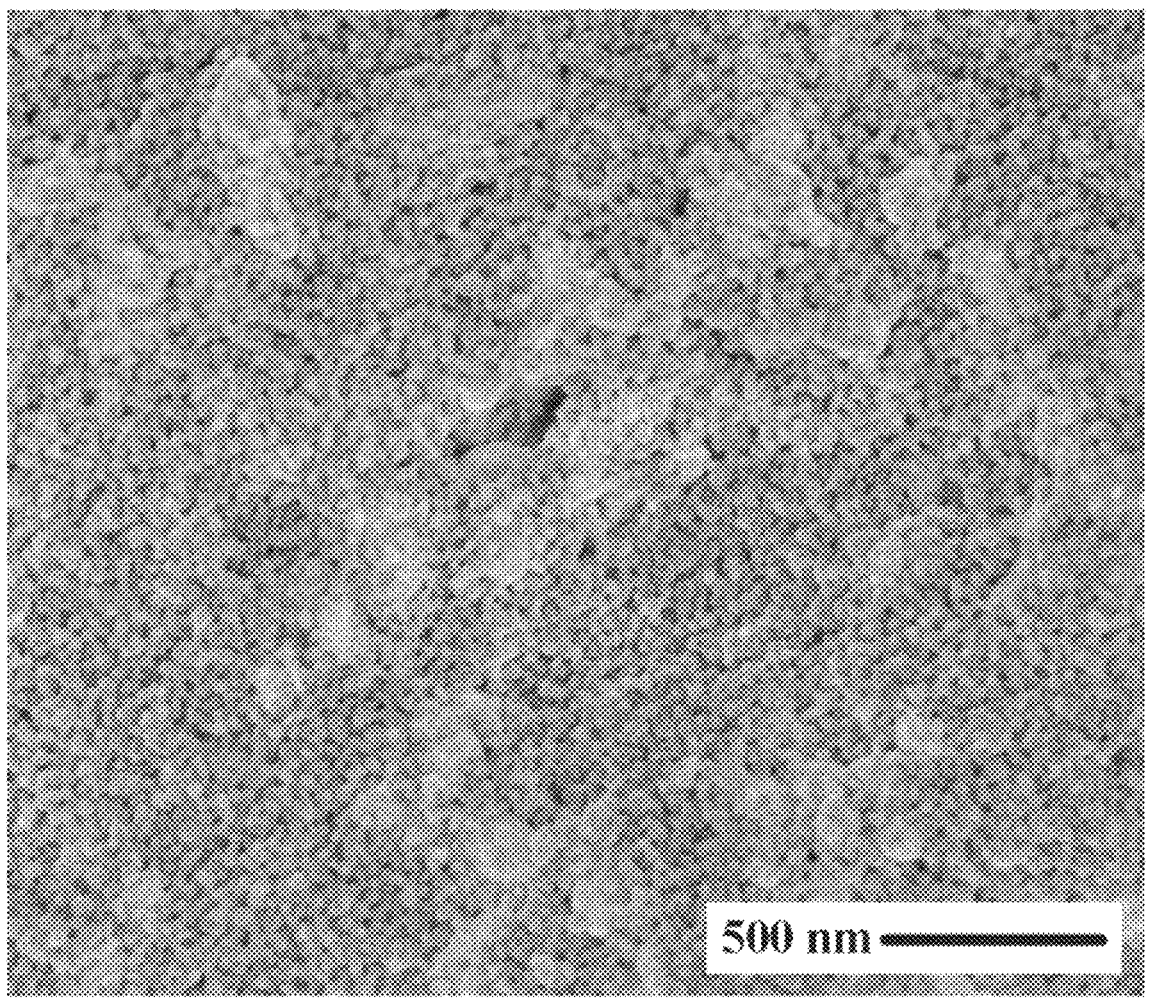
FIG. 11. SEM image of silicalite-1 crystals forming monolayer on a porous α-alumina substrate made hydrophobic according to Example 13. The method applied to deposit the monolayer onto the substrate was explained in Example 13.

A porous α-alumina substrate, as described in Example 1, was calcined in air at 500° C. for 6 hours. The calcined substrate was surface modified using 1H,1H,2H,2H-perfluoro decyltriethoxysilane by immersing the substrate in a solution containing 2.5% by weight of the carbonfluoro compound dissolved in 99.7% ethanol. The immersion time was 2 hours. After this immersion time, the substrate was rinsed with and then immersed in 99.7% ethanol for 1 hour. Subsequently, the substrate was rinsed with filtered (0.1 μm) distilled water, immersed in 0.001 M aqueous solution of sodium hydroxide for 1 hour, rinsed with filtered distilled water, and finally with filtered 0.1 M ammonia solution. After this treatment, the substrate was immersed in filtered (0.8 μm) 1% by weight aqueous cationic polymer solution as hydrophobicity adjusting medium for 10 minutes followed by rinsing with filtered 0.1 M ammonia solution and immersion in filtered (0.2 μm) 1% by weight aqueous dispersion of silicalite-1 crystals for 10 minutes. The seeded substrate was rinsed with filtered 0.1 M ammonia solution and placed in a 60° C. oven to dry. The deposition of the silicalite-1 crystals onto the substrate surface was examined with Scanning Electron Microscopy using a FEI Magellan 400 field emission instrument. The sample was not coated in order to improve the conductivity before the SEM image was recorded. As shown in FIG. 11, the substrate surface was covered with a monolayer of silicalite-1 crystals with an average diameter of about 50 nm.

Example 14

Figure 12:
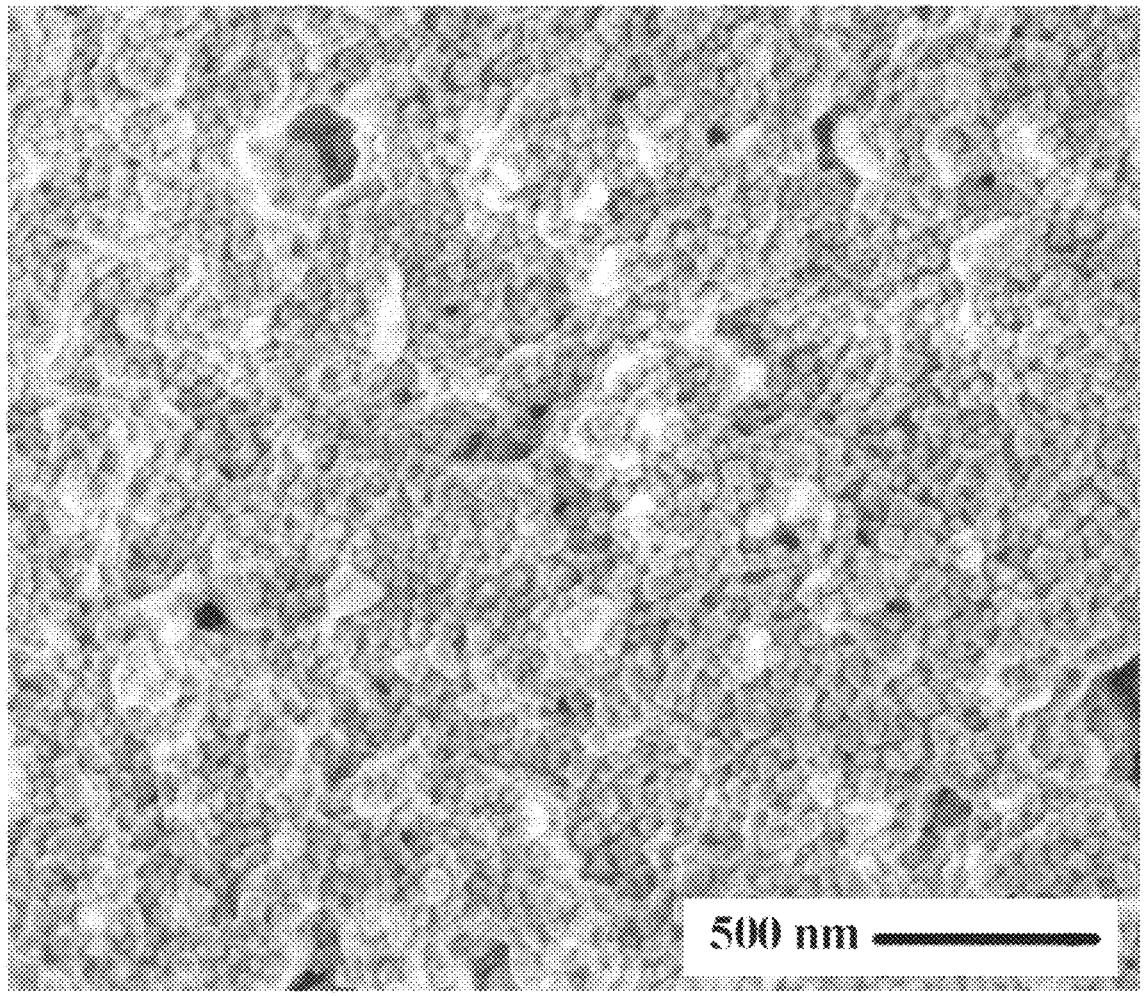
FIG. 12. SEM image of FAU crystals forming monolayer on a porous α-alumina substrate made hydrophobic according to Example 14. The method applied to deposit the monolayer onto the substrate was explained in Example 14.
Figure 13:
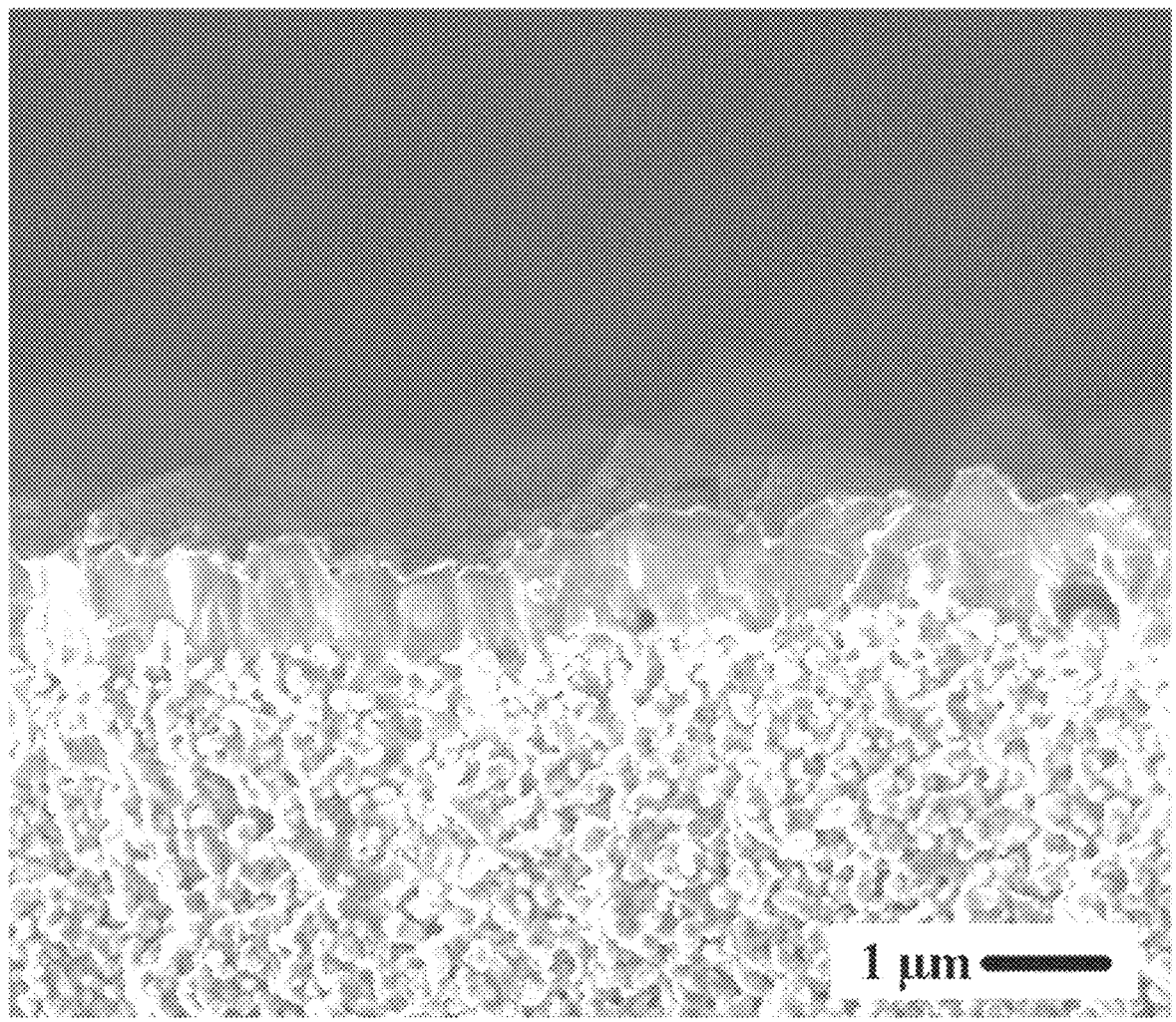
FIG. 13. SEM image of a zeolite-Y membrane synthesized on the top layer of a porous α-alumina substrate made hydrophobic and seeded according to Example 14.

A porous α-alumina substrate, as described in Example 1, was calcined in air at 500° C. for 6 hours. The calcined substrate was surface modified using 1H,1H,2H,2H-perfluoro decyltriethoxysilane by immersing the substrate in a solution containing filtered (0.1 µm) 2.5% by weight of the carbonfluoro compound dissolved in 99.7% ethanol. The immersion time was 1 hour. The hydrophobic substrate was then rinsed with filtered (0.1 µm) ethanol, filtered (0.1 µm) distilled water and subsequently immersed in 0.001 M aqueous solution of sodium hydroxide for 1 hour. Subsequently, the substrate was rinsed with filtered distilled water, filtered 0.1 M ammonia solution, and then immersed in filtered (0.8 µm) 1 weight-percent aqueous cationic polymer solution for 10 minutes. After this treatment, the substrate was rinsed with filtered 0.1 M ammonia solution, dried on a laminar flow bench for an hour and a half and finally immersed in an filtered (0.45 µm) aqueous dispersion obtained by mixing a dispersion of 0.5% by weight of FAU crystals with 32% by weight aqueous tetrabutylammoniumbromide solution in the weight ratio 9:1. The immersion time was 10 minutes. After the substrate was rinsed with filtered 0.1 M ammonia solution and dried in a 60° C. oven, the deposition of the FAU crystals onto the substrate surface was examined with Scanning Electron Microscopy using a FEI Magellan 400 field emission instrument. The sample was not coated in order to improve the conductivity before the SEM image was recorded. As shown in FIG. 12, the substrate surface was covered with a monolayer of FAU crystals. Subsequently, a parallel sample was immersed in a synthesis solution with the composition: 80 $Na_2O$: 1 $Al_2O_3$: 9 $SiO_2$: 5000 $H_2O$ and treated hydrothermally in an oil bath at 100° C. for 3 hours. After cooling, the sample was rinsed with 0.1 M aqueous $NH_3$ to remove loosely bound crystals from the synthesis solution attached on the surface of the membrane. A Scanning Electron Microscopy image of the cross section of the calcined zeolite-Y membrane showed a film thickness of about 700 nm, as shown in FIG. 13.

The invention claimed is:

1. A method for producing a crystalline separation membrane comprising zeolite crystals and/or zeolite-like crystals on a porous substrate, said method comprising the steps of:
   a) providing a porous substrate comprising pores,
   b) masking at least a portion of said porous substrate solely by the treatment of said porous substrate with a composition comprising one or more hydrophobic agent(s), as the sole masking agents thereby providing a hydrophobic porous substrate surface, wherein said one or more hydrophobic agent(s) in step b) is/are selected from the group consisting of: octylhydroxamate, decylhydroxamate, dodecylhydroxamate, octadecyltrihydrosilane, triethoxypropylsilane, 1H,1H,2H,2H-perfluorodecyltriethoxysilane, 1H,1H,2H,2H-perfluorodecyltrichlorosilane, trimethyloctylsilane, 1H,1H,2H,2H-perfluorocetylmethyldichlorosilane, and 1H,1H,2H,2H-perfluorooctyltrimethoxysilane, or a combination thereof,
   d) subjecting said hydrophobic porous substrate surface to a composition comprising seed zeolite crystals and/or seed zeolite-like crystals thereby depositing said seed zeolite crystals and/or seed zeolite-like crystals on said hydrophobic porous substrate surface to provide a seeded hydrophobic porous substrate, and
   e) growing a crystalline film comprising zeolite crystals and/or zeolite-like crystals on said seeded hydrophobic porous substrate surface obtained in step d) under hydrothermal crystallization conditions, thereby producing the crystalline separation membrane comprising zeolite crystals and/or zeolite-like crystals on the porous substrate, wherein said hydrophobic porous substrate surface, solely masked according to step b), prevents crystalline film material comprising zeolite crystals and/or zeolite-like crystals from depositing within the pores of said hydrophobic porous substrate surface during the hydrothermal crystallization;
   wherein said hydrophobic porous substrate surface obtained in step b) is further modified in a step c) prior to step d) by treatment with a composition comprising one or more hydrophobicity adjusting agent(s).

2. The method of claim 1, wherein the method further comprises a step f) following step e):
   f) calcining said hydrophobic porous substrate surface with said crystalline separation membrane comprising zeolite crystals and/or zeolite-like crystals obtained in step e).

3. The method of claim 1, wherein said zeolite crystals and/or zeolite-like crystals is selected from the group consisting of silicalite, silicalite-1, zeolite A, zeolite Beta, zeolite L, zeolite Y, zeolite X, ZSM-22, ZSM-11, ZSM-5, ZSM-2, LTA, SAPO-34, DDR, mordenite, chabazite, sodalite, ferrierite, and phillipsite, or a combination thereof.

4. The method of claim 1, wherein said one or more hydrophobicity adjusting agent(s) is selected from the group consisting one or more ionic polymer(s), and one or more silane coupling agent(s), or a combination thereof.

5. The method of claim 4, wherein said one or more hydrophobicity adjusting agent(s) is said one or more ionic polymer(s), wherein said one or more ionic polymer(s) is a cationic polymer.

6. The method of claim 1, wherein the pores of the pourous substrate have a pore size from 1 nm to 1000 nm.

7. The method of claim 1, wherein the crystalline separation membrane comprising zeolite crystals and/or zeolite-like crystals has a thickness of about less than 10 µm.

8. The method of claim 1, wherein said hydrophobic porous substrate surface prevents the seed zeolite crystals and/or seed zeolite-like crystals from depositing in the pores of said hydrophobic porous substrate surface.

9. The method of claim 1, wherein said porous substrate comprises a top layer having pore sizes from about 1 nm to about 1000 nm, and a bottom layer having pore sizes from about 1 µm to about 10 µm.

10. The method of claim 1, wherein the hydrophobic porous substrate surface in step b) exhibits a static contact angle between water and said hydrophobic porous substrate surface from 120° to 140° at 20° C.

11. The method of claim 1, wherein the hydrophobic porous substrate surface in step c) exhibits-a static contact angle between water and said hydrophobic porous substrate surface from 90° to 125° at 20° C.

\* \* \* \* \*